US005505535A

United States Patent [19]
Kawasaki et al.

[11] Patent Number: 5,505,535
[45] Date of Patent: Apr. 9, 1996

[54] CAMERA SYSTEM AND PHOTOGRAPHING LENS THEREOF

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 368,958

[22] Filed: Jan. 5, 1995

Related U.S. Application Data

[63] Continuation of Ser. No. 115,795, Sep. 3, 1993, Pat. No. 5,416,555, which is a continuation of Ser. No. 691,976, Apr. 26, 1991, abandoned.

[30] Foreign Application Priority Data

Apr. 26, 1990 [JP] Japan ................................ 2-110766
May 8, 1990 [JP] Japan ................................ 2-117930

[51] Int. Cl.$^6$ ................................ G03B 13/36
[52] U.S. Cl. ................................ 354/400; 354/286
[58] Field of Search ................................ 354/400, 286, 354/402

[56] References Cited

U.S. PATENT DOCUMENTS

| | | |
|---|---|---|
| 4,239,354 | 12/1980 | Shenk . |
| 4,477,164 | 10/1984 | Nakai et al. . |
| 4,509,842 | 4/1985 | Taniguchi et al. . |
| 4,541,700 | 9/1985 | Bletz et al. . |
| 4,560,267 | 12/1985 | Nakai et al. . |
| 4,602,861 | 7/1986 | Taniguchi et al. . |
| 4,673,275 | 6/1987 | Nakai et al. . |
| 4,724,453 | 2/1988 | Hamano . |
| 4,737,812 | 4/1988 | Hasegawa et al. . |
| 4,841,322 | 6/1989 | Kawasaki et al. . |
| 4,860,113 | 8/1989 | Miyamoto et al. . |
| 4,881,094 | 11/1989 | Terui et al. . |
| 4,896,181 | 1/1990 | Saegusa . |
| 4,922,283 | 5/1990 | Fukui . |
| 4,945,376 | 7/1990 | Kawasaki et al. . |
| 5,060,005 | 10/1991 | Itoh et al. ................. 354/386 |
| 5,066,969 | 11/1991 | Kawasaki et al. . |
| 5,093,680 | 3/1992 | Suzuki et al. ................. 354/400 |
| 5,166,717 | 11/1992 | Kawasaki et al. . |
| 5,170,200 | 12/1992 | Kawasaki et al. . |
| 5,181,061 | 1/1993 | Kawasaki et al. . |
| 5,182,591 | 1/1993 | Kawasaki et al. . |
| 5,223,877 | 6/1993 | Kawasaki et al. . |
| 5,255,043 | 10/1993 | Kawasaki et al. . |

FOREIGN PATENT DOCUMENTS

| | | |
|---|---|---|
| 266793 | 5/1988 | European Pat. Off. . |
| 0357056 | 3/1990 | European Pat. Off. . |
| 2950932 | 7/1980 | Germany . |
| 3634148 | 4/1987 | Germany . |
| 1206323 | 8/1989 | Japan . |
| 1259333 | 10/1989 | Japan . |
| 2232262 | 12/1990 | United Kingdom . |
| 2241075 | 8/1991 | United Kingdom . |

OTHER PUBLICATIONS

U. Tietze Ch. Schenk, "Halbleiter–Schaltungstechnik" 9 edition, pp. 682, 683, 254 and 255.
U.K. Search Report issued on Nov. 15, 1988.
U.K. Search Report issued in counterpart U.K. application No. 9109115.7.
French Search Report issued in counterpart French application No. 91 05187.
Official Action mailed in German counterpart application No. P 41 13 764.7–51.

*Primary Examiner*—Russell E. Adams
*Attorney, Agent, or Firm*—Sandler, Greenblum & Bernstein

[57] ABSTRACT

A camera system includes a camera body and a photographing lens which is detachably attached to the camera body. The photographing lens has an input and output device which inputs and outputs data to and from the camera body, a timing controller which outputs clock pulses for driving the input and output device, and a loading device which loads specific initial value lens data in the input and output device in accordance with the clock pulses. The camera body includes an information processing device which receives the specific initial value lens data loaded in the input and output device.

20 Claims, 17 Drawing Sheets

CAMERA SYSTEM AND PHOTOGRAPHING LENS THEREOF

This application is a continuation of application Ser. No. 08/115,795, filed Sep. 3, 1993, now U.S. Pat. No. 5,416,555, which is a continuation of application Ser. No. 07/691,976, filed Apr. 26, 1991, now abandoned.

BACKGROUND OF THE INVENTION

1. Field of the Invention

The present invention relates to a camera system having a signal communication function between a camera body and a photographing lens and an improved photographing lens thereof.

2. Description of Related Art

In a recent single lens reflex camera having an automatic focusing device, information peculiar to a photographing lens, such as open F-number data used in an automatic exposure function or an automatic focusing function, is sent as electrical signals from the photographing lens to a CPU (central processing unit) of a camera body.

Information peculiar to the photographing lens is stored in a lens ROM provided in the photographing lens. The photographing lens and the camera body are provided with electrical contacts on a lens mount and a body mount to transmit and receive the signal information between the photographing lens and the camera body, respectively. The body CPU transmits and receives the signal information to and from the lens ROM through the electrical contacts and reads the data stored in the lens ROM. A clock pulse is output from the camera body to send address signals from the body CPU synchronously therewith, so that predetermined data can be read out from the lens ROM in accordance with the address signals. The reading of the data from the lens ROM is carried out in accordance with a serial communication controlled by the body CPU. The CPU can not simultaneously perform other operations at real time during the communication.

Furthermore, in the case of a photographing lens having an AF motor (automatic focusing motor) and a PZ motor (power zoom motor), etc., if the control of these motors is affected by the body CPU, there is an over load on the body CPU. In particular, in a single lens reflex camera in which various kinds of photographing lenses are exchangeably mounted to one camera body, the body CPU must read different parameters, depending on the photographing lenses, from the associated lens ROM's and perform predetermined arithmetic operations in accordance with the read parameters thereby to control the photographing lenses. This makes quick operations impossible or next to impossible.

On the other hand, the provision of different lens ROM's for every photographing lens increases the manufacturing cost thereof.

It is desirable in a single lens reflex camera that if a novel camera body or photographing lens is newly developed, the new camera body or the new photographing lens can be used for an old type photographing lens or camera body, and vice versa.

SUMMARY OF THE INVENTION

The primary object of the present invention is to decrease the load of operations of a camera body side, to make it possible to set data of a photographing lens lo synchronously with a clock pulse output from the camera body, and to realize a novel camera system compatible to a conventional camera system.

To achieve the object mentioned above, according to the present invention, there is provided a camera system including a camera body, and a photographing lens which is detachably attached to the camera body, the photographing lens comprises an input and output means for inputting and outputting data .to and from the camera body, a timing control means for outputting clock pulses for driving the input and output means, and a loading means for loading specific initial value lens data in the input and output means in accordance with the clock pulses, the camera body comprises an information processing means for receiving the specific initial value lens data loaded in the input and output means.

With this arrangement, since the photographing lens can set the specific initial value data asynchronously with the clock pulse from the camera body, it is unnecessary to set the specific initial value data at a constant time interval determined by the control of the camera body side. Accordingly, the time for adjustment on the photographing lens side can be increased, so that the necessary operations, such as calculation can be performed on the photographing lens side and the camera body side in the increased space of time.

According to another aspect of the present invention, a shift register can be provided in the input and output means of the photographing lens. The timing control means can be comprised of a clock generating means and a lens CPU. Upon transfer of the data to the camera body, the initial value data is first loaded in the shift register in accordance with the clock pulse from the timing control means. The loaded data is then serially transferred to the camera body. The data calculated by the lens CPU and output therefrom is loaded after the loading of the initial value data into the shift register. Consequently, the lens CPU performs the arithmetic operation independently of the transfer of the initial value data during the shifting of the initial value data in the shift register, which decreases ,the time necessary for transferring and processing the data.

The other aim of this invention is to offer a camera system, a camera body and photographing lens, in which either of the components can be attached to a former type of its partner and are able to interchange Information with each other without passing through an input and output means after the completion of the process in which the photographing lens transfers specific initial value lens data to the camera body by its order through the input and output means.

In order to show a desirable example of this invention, it adopts claims 1 and 58. According to the combination of the inventions above, it enables a camera body and a photographing lens to interchange information with each other in a shorter period of time than before because of the following fact:

Initial value data output from photographing lens is not only transferred to the camera body through an input and output means in the same way as before but the data can also be interchanged without passing through an input and output means;

A lens information processing means having a calculating function installed in the photographing lens calculates the variable lens data, some of which data can not be calculated by an information processing means installed in the camera body.

The present disclosure relates to subject matter contained in Japanese patent applications No. 02-110766 (filed on Apr.

26, 1990) and No. 02-117930 (filed on May 8, 1990) which are expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
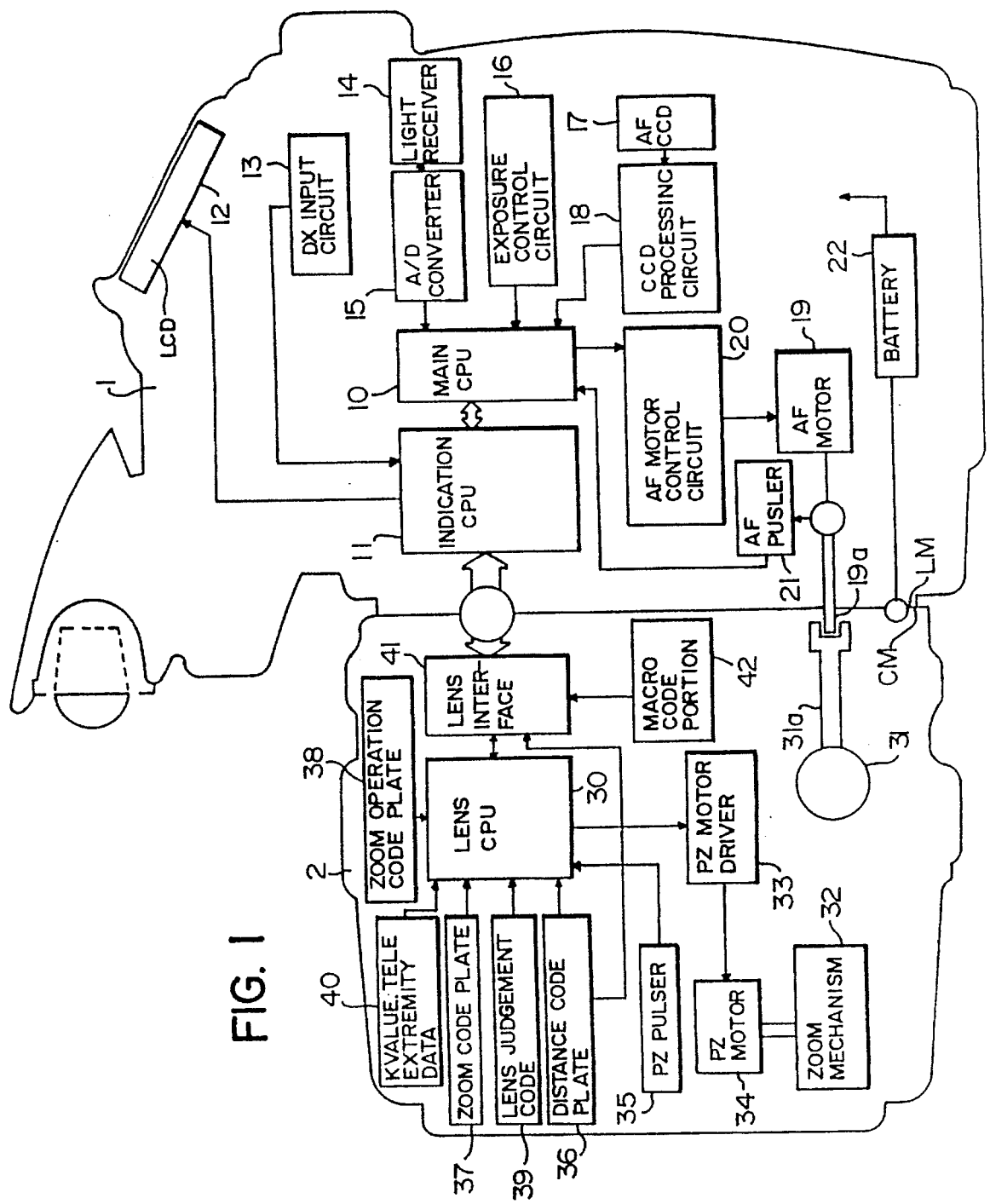
FIG. 1 is a block diagram of a single lens reflex camera having a camera system according to the present invention.

FIG. 1 shows a single lens reflex camera having a camera system according to an aspect of the present invention.

A camera body 1 has a main CPU 10 and an indication CPU 11. The main CPU 10 generally controls the whole camera system and performs arithmetic operations of various data necessary for taking a picture. The indication CPU 11 functions not only as an interface (data communication) to input data by switch members and to transmit and receive data (signals) to and from a photographing lens 2, but also as a controller to control the indication of the photographing data.

A light receiver 14, which receives light incident thereon through the photographing lens 2 and correspondingly outputs analog signals in accordance with the amount of light received, is connected to the main CPU 10 through an A/D converter 15. The indication CPU 11 is connected to an LCD panel 12 which indicates the photographing data and is also connected to a DX code input circuit 13 which selectively reads at least ISO sensitivity data of a film from DX codes provided on the surface of a patrons of the film.

The main CPU 10 is also connected to an exposure control circuit 16 which drives and controls a shutter mechanism (not shown) and a diaphragm mechanism (not shown), etc., in accordance with the input photographing data, a CCD processing circuit 18 which detects the focusing of the photographing lens 2 in response to data (focal point data) of an object to be taken (this data is output from an automatic focusing CCD object distance measuring sensor 17), an AF motor control circuit 20 which drives an AF motor 19, and an AF pulser 21 which detects the angular displacement of the AF motor 19 to generate pulses corresponding to the angular displacement. The object distance measuring sensor 17 receives light of the object which is divided into two or more light fluxes and is made incident through the photographing lens 2 to output a predetermined phase difference signal (defocus signal). The AF motor 19 drives a focusing mechanism 31 through a coupler 19a provided on a body mount BM of the camera body so as to project from the camera body and a coupler 31a provided on a lens mount LM of the photographing lens 2 when the connection between the couplers 19a and 31a is established to move groups of focusing lenses (not shown).

A battery 22 supplies power through the motors not only to the electronic components and electronic circuits in the camera body 1, but also to electronic components and electronic circuits in the photographing lens 2.

In the photographing lens 2 are provided a focusing mechanism 31 which rotates a focus adjusting cam ring (not shown) to relatively move the focusing lens groups in the optical axis direction to thereby affect the focusing, and a zooming mechanism 32 which rotates a zoom ring (not shown) to relatively move at least two groups of variable power lenses in the optical axis direction to affect the zooming.

The focusing mechanism 31 is connected to the coupler 31a which is electrically connected to the coupler 19a when the photographing lens 2 is attached to the camera body 1 in order to transmit the rotational drive of the AF motor 19 to the focusing mechanism 31. The couplers 19a and 31a are disconnected from one another by a disengaging means (not shown), so that a photographer can manually rotate a focus adjusting operation ring to adjust the focus in the manual focusing mode.

The zooming mechanism 32 is driven by a zoom operation ring (not shown) which is in turn driven by a PZ (power zoom) motor 34 in the power zoom mode and by the photographer in the manual zoom mode, respectively. The PZ motor 34 is driven and controlled by a lens CPU 30 through a power zoom (PZ) motor driver 33 in the power zoom mode. The power zoom mode includes a manual power zoom mode in which the power zooming is affected by the operation of a zoom switch SWZM2 (FIG. 3), and a controlled power zoom mode in which the zooming is automatically controlled in accordance with the judgement of the lens CPU 30. The "controlled power zoom" referred to herein is a power zoom in which a focal length f at which a specific object is in focus is varied so as to keep the value of d/f (wherein d designates the object distance) constant when the object distance d changes. The power zoom mode and the manual zoom mode are selected by a switching means which is actuated by a zoom switch SWZM1.

To input ports of the lens CPU 30 are connected a PZ pulser 35 which detects the displacement of the PZ motor 34 and generates a predetermined number of pulses corresponding thereto, a distance code plate A 36 which reads the position data of the focus adjusting cam ring (focusing lens groups) driven by the focusing mechanism 31, a zoom code plate 37 which reads the position data (focal length data) of the zooming cam ring (variable power lens groups) driven by the zooming mechanism 32, a zoom operation code plate 38 which inputs data of the direction and speed of the power zooming by the operation of the zoom operation switch, a lens judgement code plate 39 which judges the kind of the photographing lens (zoom lens, single focus lens, or single focus macro lens, etc), and a K value input member 40 which inputs data of the K value at a telephoto extremity. In the illustrated embodiment, "K value" means the number of pulses of the AF pulser necessary for moving an image plane formed by the photographing lens 2 through a unit displacement, but is not limited thereto.

The distance code plate A 36 and the other code plates are ones per se known. Usually, these code plates are secured to a cam ring or cam rings and selectively connected to respective brushes having a plurality of electrical contacts which are brought into slide contact with the codes (conducting portions and non-conducting portions) of the code plates. The positions of the cam rings are detected as bit information by a combination of the codes with which the electrical contacts of the brushes come into contact. However, the data detecting mechanism is not limited to such a combination of the code plates and the brushes.

A lens interface 41 is connected to a data input terminal of the lens CPU 30. The data communication between the lens CPU 30 and the indication CPU 11 is effected through the lens interface 41 to which a macro code member 42 is connected in order to input macro data thereto in the macro mode.

The lens CPU 30 performs the arithmetic operation to obtain various data, such as a present focal length, a present object distance, etc. The data (program, algorithm, constant, etc.) necessary for the arithmetic operation is stored in an internal ROM 30a of the lens CPU 30.

Circuit of Camera Body

Figure 2:
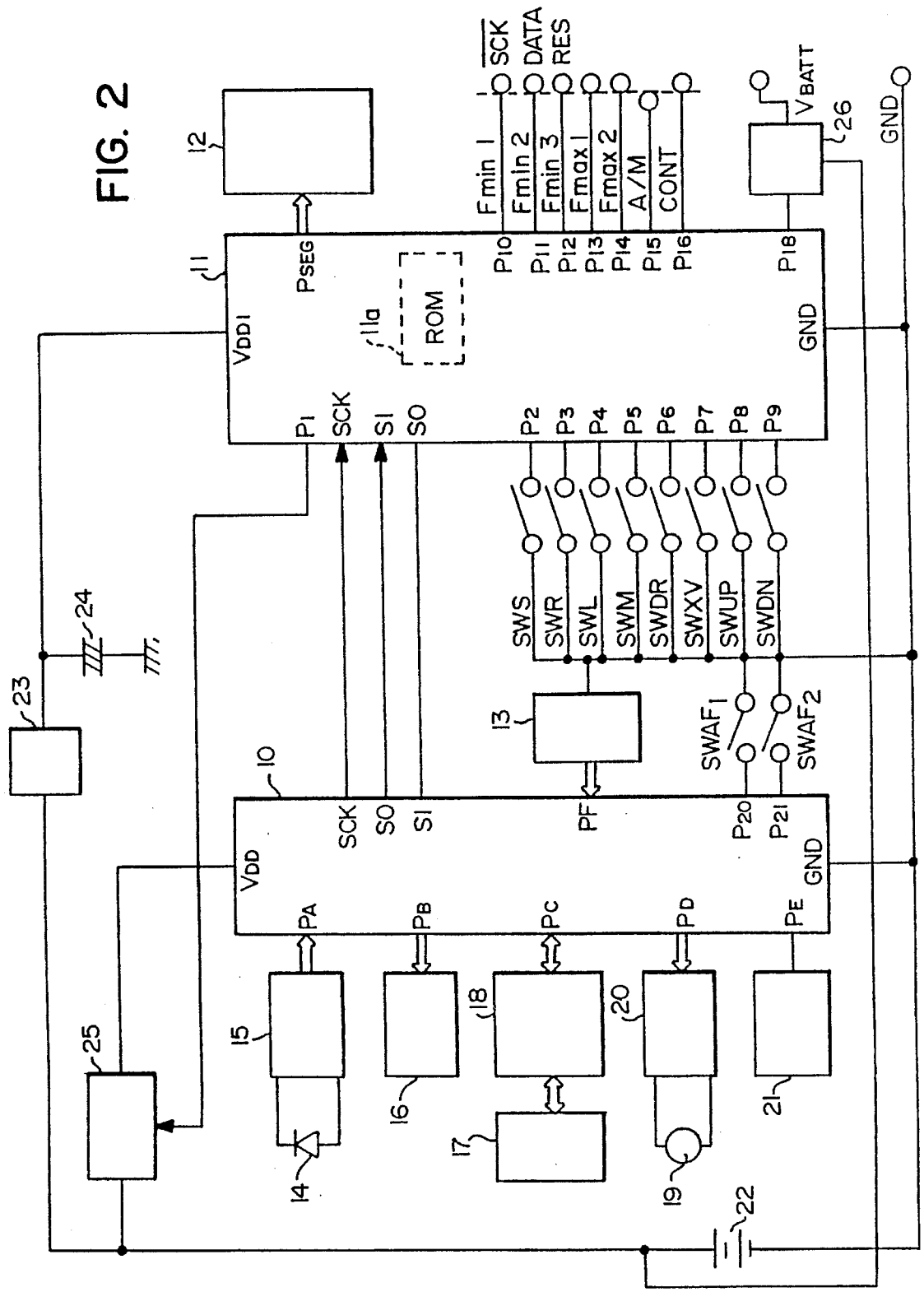
FIG. 2 is a block diagram of a main circuit arrangement of a camera body shown in FIG. 1.

The circuit arrangement of the camera body 1 will be described below in detail with reference to FIG. 2.

The voltage of the battery 22 which is controlled by a regulator 23 and which is backed up by a super capacitor 23 is supplied to a terminal VDD1 of the indication CPU 11. The indication CPU 11 is always activated at a constant voltage input to the terminal VDD1.

Terminals P1 and P2 of the indication CPU 11 are connected to a DC/DC converter 25 which turns the power source of the main CPU 10 ON and OFF and a photometer switch SWS which is turned ON when the shutter button (not shown) is pressed by a half step, respectively. Furthermore, terminals P3 and P4 of the indication CPU 11 are connected to a release switch SWR which is turned ON when the shutter button is fully pressed and a lock switch SWL which is turned ON when a back cover (not shown) of the camera body is closed so as to hold the indication CPU 11 etc., into a photographable position, respectively.

The DC/DC converter 25 is actuated when the lock switch SWL is turned ON and when the photometer switch SWS or the release switch SWR is made ON, and in accordance with command from the indication CPU 11 upon inputting the lens data from the photographing lens 2, to supply the terminal VDD1 of the main CPU 10 with a reference constant voltage to thereby actuate the main CPU 10.

Furthermore, terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of these switches SWM, SWDR, SWXV, SWUP, and SWDN. For instance, the exposure modes including a programmed exposure mode, an automatic exposure mode, and a manual exposure mode are selected in accordance with the operation of the mode switch SWM. Similarly, drive modes including a single shot mode and a continuous shot mode are selected in accordance with the operation of the drive switch SWDR. The selection modes can be varied in accordance with the operation of the up-switch SWUP and down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG connected to an indicating LCD 12 through a bus line. The indicating LCD 12 indicates the necessary photographing data in accordance with command of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/H, and Cont provided on the body mount BM of the camera body, respectively. A terminal P18 of the indication CPU 11 is connected to a switch circuit 26.

The electrical contacts Fmin1, Fmin2 and Fmin3 function also as communication terminals for data communication between the photographing lens 2 and the indication CPU 11. Namely, the electrical contacts Fmin1, Fmin2 and Fmin3 constitute a serial clock signal inputting and outputting terminal SCK, a data transmitting and receiving terminal DATA, and a reset signal outputting terminal RES, respectively.

The terminals P10, P11 and P12 of the indication CPU 11 are always pulled up within the indication CPU 11.

The output of the switch circuit 26 is connected to a terminal VBATT and functions as a switch for establishing and breaking the electrical connection between the battery 22 and the terminal VBATT in accordance with the level of the terminal P18. The terminal Gnd of the indication CPU 11 is connected to the ground terminal Gnd of the battery 22.

The indication CPU 11 and the main CPU 10 communicate with each other through serial terminals SCK, serial-In terminals SI and serial-out terminals SO. In the data communication, data is transferred using command codes as shown in Table 1 below. In Table 1, the left column represents data which is output from the indication CPU 11 to the main CPU 10, and the right column represents the data which is transferred to the main CPU 10 to the indication CPU 11. These data are set based on the measurements of the object luminance and the object distance, etc. controlled by the main CPU 10.

TABLE 1

| Display CPU → 4 Main CPU | Main CPU → Display CPU |
| --- | --- |
| mode set data | display Tv, Sv data |
| drive set data | film sensitivity information |
| exposure correction set data | AF accommodation pulse number data |

TABLE 1-continued

| lens CPU data, set Tv, Sv data | AP return-completion cods |
|---|---|
| AF accommodation code | |
| AF return code | |
| AF return pulse number data | |
| AF accommodation, return code | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 130 respectively.

The terminal P20 of the main CPU 10 is connected to a first AF switch SWAF1 which selects an auto focus mode in which the focusing is automatically affected by the AF motor 19 and a manual focus mode in which the focusing is manually affected by a photographer. The terminal P2 of the main CPU 10 is connected to a second AF switch SWAF2 which switches the mode of the shutter release between a focus priority mode and a release priority mode. The first and second AF switches SWAF1 and SWAF2 are mechanically associated with each other, so that for example when the manual focus mode is selected by the first AF switch SWAF1, the second AF switch SWAF2 is switched to the release priority mode. Namely, one of the AF switches SWAF1 and SWAF2 is turned ON, the other is turned OFF.

Circuit of Photographing Lens

The circuit arrangement of the electrical system provided in the photographing lens 2 will be explained below, with reference to FIG. 3.

The lens mount LM of the photographing lens 2 is provided with electrical contacts VBATT, CONT, RES (Fmin3), SCK (Fmin1), DATA (Fmin2), DND, Fmax1, Fmax2 and A/M corresponding to the associated electrical contacts provided on the body mount BM when the photographing lens 2 is attached to the camera body 1. Although the arrangement of the electrical contacts of the lens mount LM is not identical to that of the body mount BM (rearranged for the purpose of clarification), the electrical contacts of the lens mount designated are electrically connected to the corresponding electrical contacts of the body mount with the same reference numerals.

The contact VBATT on the lens side is connected to the PZ driver 33, so that the power of the battery 22 is directly supplied to the PZ motor 34 through the contact VBATT by the switching operation of the PZ driver 33.

The contacts Fmax1 and Fmax2 of the lens side also function as a steady information transmitting means for transmitting the maximum F-number data of two bits to the camera body, similarly to those provided on an existing (old) AE lens. Namely, the contacts Fmax1 and Fmax2 on the lens side are grounded through the switches SWmax1 and SWmax2, so that maximum F-number (minimum diaphragm value) data is formed in accordance with a combination of the levels of the switches SWmax1 and SWmax2 depending on the combination of ON/OFF states thereof. The combinations of the levels of the contacts Fmax1 and Fmax2 on the lens side and the maximum F-number are for example as shown in Table 2 below.

TABLE 2

| F N 0. | F max2 | F max1 |
|---|---|---|
| 22 | 0 | 0 |
| 32 | 0 | 1 |
| 45 | 1 | 0 |

The contact A/M on the lens side has a function to send the auto/manual information of the diaphragm to the camera body 1 and is grounded through a selection switch SWA/M. The selection switch SWAM is in association with the rotation of a diaphragm ring (not shown) of the photographing lens 2, so that when the diaphragm ring is in the auto position and the manual position, the selection switch is turned ON and OFF, respectively.

The contacts Fmin1, Fmin2, and Fmin3 on the lens side function not only as a steady information transmitting means for transmitting the open F-number information of three bits to the camera body 1, similarly to those provided on an existing (old) AE lens, but also as data communication contacts between the camera body and the photographing lens. The relation between the levels of the contacts Fmin1, Fmin2 and Fmin3 on the lens side and the open F-number is for example as shown In Table 3 below.

TABLE 3

| F N 0. | F min3 | F min2 | F min1 |
|---|---|---|---|
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

To provide both the steady information transmitting function and the data communication function on the contacts Fmin1, Fmin2 and Fmin3 on the lens side, these contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to the contact CONT through fuze portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of the contact CONT to drop to the ground in order to obtain the open F-number data from the lens contacts Fmin1, Fmin2 and Fmin3. As a result, a transistor (or transistors) Tr to which the fuse portion(s) is (are) connected is (are) turned ON, so that the emitter(s) of the transistor(s) which has (have) been turned ON become(s) high level H and the emitter(s) of the transistor(s) which has (have) not been turned ON become(s) ground level. Namely, the transistors Tr are selectively turned ON or OFF in accordance with the connection of the fuse portions H1, H2 and H3 to change the level of the emitters thereof. Consequently, the three-bit open F-number data is output to the lens contacts Fmin1, Fmin2 and Fmin3.

Terminals CONT, RES, SCK, DATA and GND of the lens interface 41 are connected to the terminals CONT, Fmin3, Fmin1, Fmin2 and GND on the lens side, respectively.

The lens contact CONT is connected to the bases of the transistors Tr and to the terminal CONT of the lens interface 41, as mentioned above. The switching of the power supply from the terminal CONT of the lens interface Is affected through the terminal RES (lens terminal Fmin3). After the data on the open F-number is transferred, when the terminals CONT and RES become levels H and L respectively, the power is supplied to the lens CPU 30.

The terminal VDDB of the lens interface 41 is connected to the terminal VDD of the lens CPU 30 through a condenser C2, so that the constant voltage supplied from the terminal CONT of the camera body 1 is supplied to the lens CPU 30.

Terminals DIS1, DIS2 and DIS3 of the lens interface 41 are connected to the distance code plate A36, so that distance data signals of the object distance corresponding to the position of the focusing cam ring driven by the focusing mechanism 31 are input to the terminals DIS1, DIS2 and DIS3.

Terminal MACRO of the lens interface 41 is connected to the macro code portion 42 which functions as a macro switch which is turned ON when the zoom operation ring is actuated to switch the photographing lens 2 to the macro mode.

The input and output terminals of the lens interface 41 are connected to the corresponding input and output terminals of the lens CPU 30. Reset terminal RESB, clock terminal CLK, serial-in terminal SIS, serial-out terminal SOS, terminal CE, terminal SOE, terminal ΦIN, and terminal KAFEND, of the lens interface 41 are connected to the reset terminal RESET, the serial clock terminal SCK, the serial-out terminal SO, the serial-in terminal SI, the terminal P43, the terminal P40, the terminal PCL, the terminal POO, of the lens CPU 30, respectively. A terminal CRES of the lens interface 41 is grounded through a delay condenser C1.

The lens CPU 30 controls the PZ driver 33 connected to the control terminal thereof. The lens CPU 30 is also connected to the PZ pulser 35 and the lens judgement code 39.

The terminals P30, P31, P32 and P33 and the terminals P62 and P63, of the lens CPU 30 are connected to the codes of the zoom code plate 37. The lens CPU 30 performs the arithmetic operation based on the input levels of these terminals P30, P31, P32, P33, P62, and P63 in combination to obtain the focal length data at the zooming and at the macro mode, etc.

The terminals P50, P51 and P52 and the terminals P60 and P61, of the lens CPU 30 are connected to the K value telephoto extremity data setting portion 40. The lens CPU 30 calculates the K value data corresponding to the focal length and the object distance in accordance with the data formed by a combination of the levels of the terminals P50 through P53, P60 and P61 input thereto, using the K value at the telephoto extremity and at the infinite distance in the single focus macro mode.

Furthermore, the terminals P21 through P29 of the lens CPU 30 are connected to various switches, such as the automatic focusing switch SWAF and the power zoom switches SWPZ1 and SWPZ2, etc., so that the lens CPU 30 performs a predetermined operation in response to the operations of the switches.

The photographing lens 2 has a clock pulse generating circuit 43 as a clock signal generating means which is connected to the clock terminals X1 and X2 of the lens CPU 30. The lens CPU 30 operates synchronously with the clock pulses generated by the clock pulse generating circuit 43. The clock pulse generating circuit 43 constitutes a timing control means.

As mentioned above, on the camera body side, after the terminal CONT drops to the level L and the open F-number is read, both the terminals CONT and RES (Fmin3) become level H to reset the lens CPU 30.

When the reset is released, the lens CPU 30 calculates specific data which is then set in the shift register in the lens interface 41 asynchronously with the clock pulses output from the camera body 1. The calculated data is successively output from the shift register in accordance with the clock signals of the camera body 1. This communication is carried out by hardware of the lens interface 41. In the illustrated embodiment, the specific arithmetical data for 19 bytes is sent to the camera body 1.

Upon completion of the communication, the terminal KAFEND of the lens Interface 41 becomes level L which is a communication completion signal. Consequently, the lens CPU 30 waits for renewal data of the communication from the camera body 1.

When the lens CPU 30 receives the renewal communication data from the camera body 1, the terminal DATA (Fmin2) which has been at level H becomes level L and then becomes level H again, so that the camera body can commence the new communication. Note that the states of the terminals CONT and RES when the lens CPU 30 is first activated are held.

In the new data communication, the data is transferred from the photographing lens 2 to the camera body 1 or from the camera body 1 to the photographing lens 2, in accordance with the command code output from the camera body 1. The new data communication is effected synchronously with the clock pulse output from the photographing lens 2.

The data communicating between the photographing lens 2 and the camera body 1 is as shown in Tables 4 and 5 below.

TABLE 4

| lens → body | |
|---|---|
| AF information | 0011.0001(31H) |
| AE information | 0011.0010(32H) |
| all data | 0011.0011(33H) |
| each single bite | 0101.XXXX(5XH) |
| lens information 1 | 0110.0000(60H) |
| lens information 2 | 0110.0001(61H) |
| body → lens | |
| focal length information fWide | 0110.0010(62H) |
| focal length information fTele | 0110.0011(63H) |
| focal length information fX(present) | 0110.0100(64H) |
| lens drive information | 0110.0110(66H) |
| lens accommodation | 1001.0000(90H) |
| lens return | 1001.0001(91H) |
| PH ON | 1001.0010(92H) |
| PH OFF | 1001.0011(93H) |

TABLE 5

| | lens info. 1 61H | lens info. 2 61H | lens drive info. 66H |
|---|---|---|---|
| Bit 7 | PH demand | LENS CPU | fw end |
| Bit 6 | AF A/M | | fT end |
| Bit 5 | PZ A/M | PZ in LENS | |
| Bit 4 | PZ P/A | | |
| Bit 3 | PZ MODE | | PZ Far |
| Bit 2 | SET SW | | PZ Near |
| Bit 1 | LENS A/M | LENS | |
| Bit 0 | LENS O/C | version | |

Interface Circuit

Figure 4:
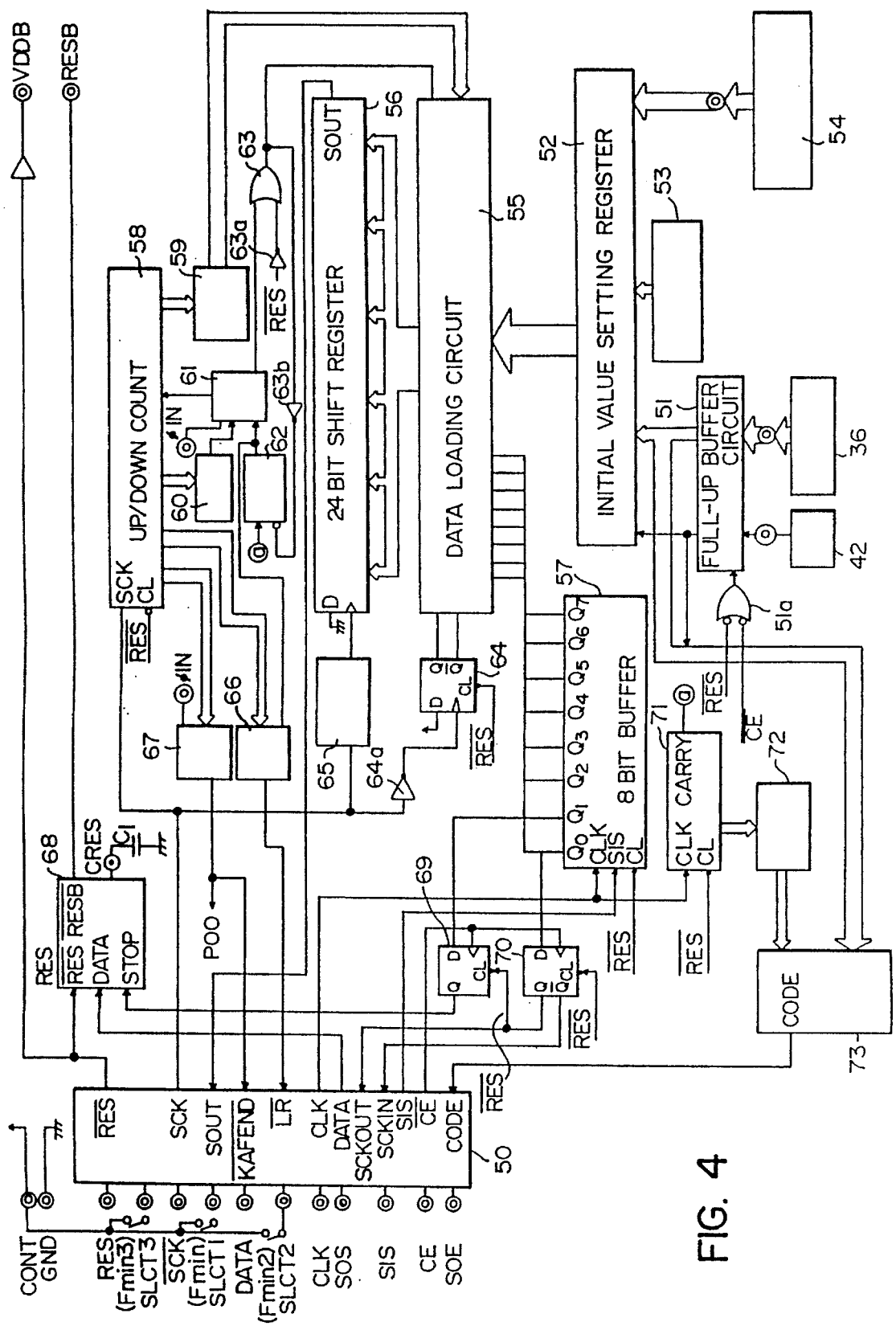
FIG. 4 is a block diagram showing a lens interface circuit shown in FIG. 1 in more detail.

The construction of the lens interface 41 will be described below in detail with reference to FIG. 4.

The lens interface 41 functions not only as input and output means for sending the lens data of the photographing lens 2 to the camera body 1 in accordance with the sequential hardware control by the digital circuit, but also as an interface circuit for direct data communication by software between the indication CPU 11 of the camera body 1 and the lens CPU 30 of the photographing lens 2.

When the photographing lens 2 is attached to the camera body 1, so that the lock switch SWL is turned ON, the constant voltage is supplied from the camera body 1 (the terminal P16 of the indication CPU 11) to the lens interface 41 through the terminals CONT. Consequently, the reference constant voltage is supplied to the terminal VDD of the lens CPU 30 from the terminal VDDB of the lens interface 41. As a result, the lens CPU 30 activates the clock pulse generating circuit 43 by the reference constant voltage, so that the lens CPU 30 operates synchronously with the generated clock pulses. The lens interface 41 includes an I/O block 50 having the terminals VDDB, RES, etc., mentioned above.

The distance code plate A36 and the macro code portion 42 are connected to a pull-up buffer circuit 51 which pulls up the terminal level of the distance code plate A36 and the macro code portion 42 to send the output to an initial value setting register 52 in parallel as a part of the initial data of 3 bytes.

A pair of inputs of a NAND gate 51a which is connected at the output thereof to the pull-up buffer circuit 51 are connected to terminals RES and CE. At the initial stage prior to the communication (previous communication), the terminals RES and CE are held at levels L and H by the indication CPU 11 and the lens CPU 30, respectively. Accordingly, the level of the output of the NAND gate 51a is H, and the pull-up buffer circuit 51 fetches the initial data.

An internal initial value setting portion 53 and an external initial value setting portion 54 are connected to the input terminals of the initial value setting register 52. The initial value setting register 52 stores the initial data (unit of 1 byte) for three bytes output from the pull-up buffer circuit 51, the internal initial value setting portion 53 and the external Initial value setting portion 54.

Figure 8:
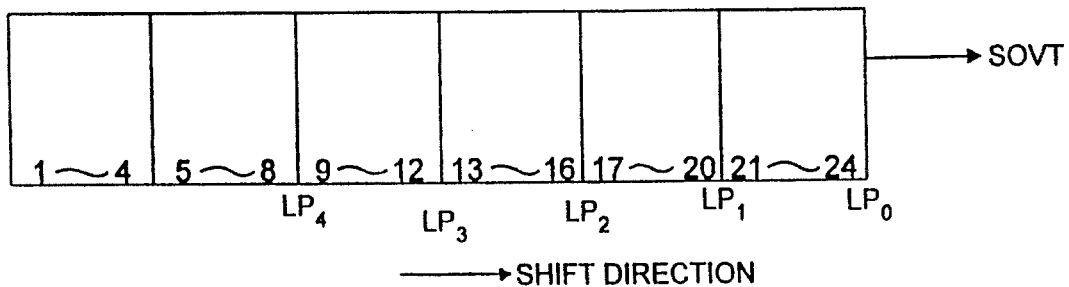
FIG. 8 is a schematic view of a 24 bit shift register in a lens interface circuit.

A group of the output terminals of the initial value setting register 52 are connected to a group of the input terminals of a data loading circuit 55 through a bus. The data loading circuit 55 has a function to load the initial data for three bytes onto the 24 bit shift register 56 at one time and a function to load an arithmetic data group (discussed below) having a unit of 1 byte onto a predetermined loading point LP of the 24 bit shift register 56. The 24 bit shift register 56 is of a parallel input and series output type which is schematically shown in FIG. 8.

The 24 bit shift register 56 performs the shifting in accordance with the clock pulses output from the indication CPU 11 to successively transfer the data latched in each flip-flop FF to the terminals SOUT from which the transferred data is serially output.

A series input and parallel output type of 8 bit buffer 57 is connected to the input of the data loading circuit 55. The arithmetic data operated in the lens CPU 30 is serially input into the 8 bit buffer 57 from the input terminal SIS synchronously with the clock pulses output from the lens CPU 30.

The terminals CLK (clock) and CL (clear) of the 8 bit buffer 57 are connected to the terminal CLK of the I/O block 50, and the terminal RES, respectively. The output terminals 00 through 07 of the 8 bit buffer 57 are connected to the present terminals PR corresponding to the flip-flop FF of the 24th stage of the 24 bit shift register 56 through a predetermined logic gate group discussed hereinafter.

When the data for 8 bits is collected in the 8 bit buffer 57, the data is loaded on a predetermined portion after the loading points LP4, LP3, LP2, LP2, and LP0 of the 24 bit shift register 56 at a predetermined timing through the data loading circuit 55. The first arithmetic data for 8 bits is loaded on a portion immediately after the initial data for three bytes. Thereafter, the data is successively and continuously loaded immediately after the previously loaded arithmetic data.

The position of the flip-flop FF which latches the final bit of the data loaded in the 24 bit shift register 56 is detected by the counted values of an UP/DOWN counter 58. A load pointing decoder 59 sets the first flip-flop (i.e. the loading point LP) of the 24 bit shift register 56 that loads the arithmetic data for one byte stored in the 8 bit buffer 57 (according to the counted values of the UP/DOWN counter 58). For example, when the initial data (or the arithmetic data) is shifted to the 9th flip-flop in FIG. 8, the arithmetic data of one byte is loaded in parallel on the flip-flops FF1 through FF8 after the loading point LP4.

The loading pulse generating decoder 60 connected to the UP/DOWN counter 58 through a bus generates the control pulses to control the timing of the loading in accordance with the counted value of the UP/DOWN counter 58. For instance, every time the final data bit latched by the 24 bit shift register 56 reaches the loading points LP0 through LP4, the load pulse (H pulse) is output to the load pulse generating circuit The load pulse generating circuit 61 which receives the load pulse from the load pulse generating decoder 60 and a full signal from an 8 bit buffer full signal generating circuit 62 outputs the load pulse to the data loading circuit 55 through an OR gate 63. The data loading circuit 55 which receives the load pulse loads the arithmetic data latched by the 8 bit buffer 57 on a portion immediately after the loading point designated by the load pointing decoder 59.

When the load pulse is output from the load pulse generating circuit 61, the UP/DOWN counter 58 decreases the counted value by 8 bits for every output. As a result, the counted value of the UP/DOWN counter 58 is identical to the number of the flip-flop FF which latches the final data bit of the data loaded in the 24 bit shift register 56.

The output of the load pulse generating circuit 61 is connected to one of the input terminals of the OR gate 63, the other input terminal is connected to the reset terminal RES of the I/O block 50 through an inverter 63a. The level of the reset terminal RES is L before the operation starts, and is held H during the old communication. Consequently, when the load pulses of level H are output from the load pulse generating circuit 61 after the commencement of the communication, load pulses of level H are output from the OR gate 63 for every load pulse, so that the data loading circuit 55 performs the loading operation.

The 8 bit buffer full signal generating circuit 62 generates the full signals in response to carrying signals output from an output terminal CARRY of an octal counter 71 which counts up every time the clock pulses output from the lens CPU 30 are sent to the serial clock input terminal CLK and outputs the carrying signals from the terminal CARRY every time an increase of a figure by one place takes place, respectively. The lens CPU 30 serially outputs the arithmetic data to the terminal SIS of the 8 bit buffer 57, synchronously with the serial clock signals.

The output of the OR gate 63 is also connected to the clear terminal CL of the 8 bit buffer full signal generating circuit 62 through the inverter 63b, so that when the level of the clear terminal CL is L, the 8 bit buffer full signal generating circuit 62 is cleared and the output is returned to the initial value.

An initial value/8 bit buffer switching circuit 64 switches the loading of the initial value into the 24 bit shift register 56 or the arithmetic data operated by the lens CPU 30 and latched by the 8 bit buffer 57. The output terminals Q and $\overline{Q}$ of the initial value/8 bit buffer switching circuit 64 are connected to the data loading circuit 55. The input terminal CL of the initial value/8 bit buffer switching circuit 64 is connected to the terminal $\overline{RES}$ and the clock terminal of the initial value/8 bit buffer switching circuit 64 is connected to the terminal SCK through an inverter 64a. Also, the terminal D of the initial value/8 bit buffer switching circuit 64 is supplied with the reference voltage (level H).

The level of the terminal $\overline{RES}$ of the initial value/8 bit buffer switching circuit 64 is L at the initial state, the levels of the terminals Q and $\overline{Q}$ are L and H, respectively. In this state, the initial data is loaded on the 24 bit shift register 56.

After that, the level of the terminal $\overline{RES}$ becomes H, so that when the clock pulse from the indication CPU 11 rises, the levels of the terminals Q and $\overline{Q}$ are inverted and latched. As a result, the data of the 8 bit buffer 57 can be loaded on the 24 bit shift register 56.

The serial clock signals are input to the 24 bit shift register from the lens CPU 30 through a first SCL cancellation circuit 65 which cancels the first clock pulse after the commencement of the communication and inputs the second clock pulse and clock pulses subsequent thereto into the 24 bit shift register 56. The 24 bit shift register 56 performs the shift operation in accordance with the serial clock signals.

A rear converter signal generating circuit 66 generates rear converter signals $\overline{LR}$ (level L) to transfer the data from a rear converter (not shown) to the indication CPU 11, in accordance with the counted value of the UP/DOWN counter 58 when the transfer of the initial data of three bytes and the arithmetic data of 13 bytes is finished. The 24 bit shift register 56 is disconnected from the indication CPU 11 in accordance with the rear converter signals $\overline{LR}$.

The rear converter signal generating circuit 66 is connected to the output of the 8 bit buffer full signal generating circuit 62. Usually, the signals $\overline{LR}$ are generated when the 24 bit shift register 57 is empty. To prevent the rear converter signals $\overline{LR}$ from being generated when the buffer is full at the loading point LP0, the output of the 8 bit buffer full signal generating circuit 62 is input to the rear converter signal generating circuit 66, as mentioned above.

An old communication completion signal generating circuit 67 outputs an old communication completion signal $\overline{KAFEND}$ (level L) to the input terminal $\overline{KAFEND}$ of the I/O block 50 to complete the old communication when the counted value of the UP/DOWN counter 58 becomes a value which represents the completion of the transfer of the data for 19 bytes. Consequently, the lens CPU 30 completes the old communication in accordance with the $\overline{KAFEND}$ signal.

A reset circuit 68 resets the lens CPU 30 and has a terminal $\overline{RES}$ to which a reset pulse is input from the indication CPU 11 through an inverter etc., and an input terminal DATA to which a discrimination pulse is input from the indication CPU 11 to discriminate a new lens. An input terminal STOP of the reset circuit 68 is connected to an output terminal Q of a stop signal (STOP) generating circuit 69 to bring the lens CPU 30 into a sleep mode.

An output terminal $\overline{RESB}$ the reset circuit 58 is connected to the terminal RESET of the lens CPU 30 through the terminal $\overline{RESB}$. The output CRES is grounded through the condenser C1. Namely, the time in which the level of the output CRES drops from H to L is delayed.

The stop signal generating circuit 69 actuates the reset circuit 68 to bring the lens CPU 30 into the sleep mode. Input terminal D and clock input terminal of the stop signal generating circuit 69 are connected to the output terminal Q1 of the 8 bit buffer 57 and the terminal $\overline{CE}$ of the I/O block 50, respectively. An output terminal Q of the stop signal generating circuit 69 is connected to the terminal STOP of the reset circuit 68.

The serial clock signal (SCK) switching circuit 70 selects the clock signals output from the terminal CLK between those output from the indication CPU 11 of the camera body 1 and those output from the lens CPU 11. When the photographing lens 2 is mounted to the camera body 1, the SCK switching circuit 70 sends the serial clock signals from the lens CPU 30 to the terminal CLK during the old communication and to the indication CPU 11 during the new communication, respectively.

Clear input and clock input of the SCK switching circuit 70 are connected to the terminals $\overline{RES}$ and $\overline{CE}$ of the I/O block 50, respectively. An input terminal D of the SCK switching circuit 70 is connected to the terminal Q0 of the 8 bit buffer 57. The terminals Q and $\overline{Q}$ of the SCK switching circuit 70 are connected to the terminals SCKOUT and SCKIN of the I/O block 50.

The level of the terminal Q of the SCK switching circuit 70 is H during the old communication and is inverted to L if the level of the terminal $\overline{CE}$ rises when the terminal Q0 of the 8 bit buffer 57 is H, upon completion of the old communication. Due to the inversion, the clock signals are switched as mentioned above.

The serial clock is input from the terminal CLK to the input CLK of the octal counter 71 which counts the clock signals from the lens CPU 30 during the old communication. The octal counter 71 outputs the carrying signals from the terminal CARRY thereof every time 8 pulses are counted. Since the input terminal CL of the counter 71 is connected to the terminal $\overline{RES}$, the level of the input CL rises to H upon transfer to the old communication from the initial state.

The decoder 72 receives the counted value of the counter 71 to decode the data bits fetched by a code plate data selection circuit 73. The code plate data selection circuit 73 selects the data of the distance code plate A36 or the macro code portion 42 through the pull-up buffer circuit 51, synchronously with the decoding operation and outputs the selected data from the terminal DATA. The output data is received in the lens CPU 30.

The above discussion has been directed to the construction and operation of the lens interface 41.

I/O Block

Figure 5:
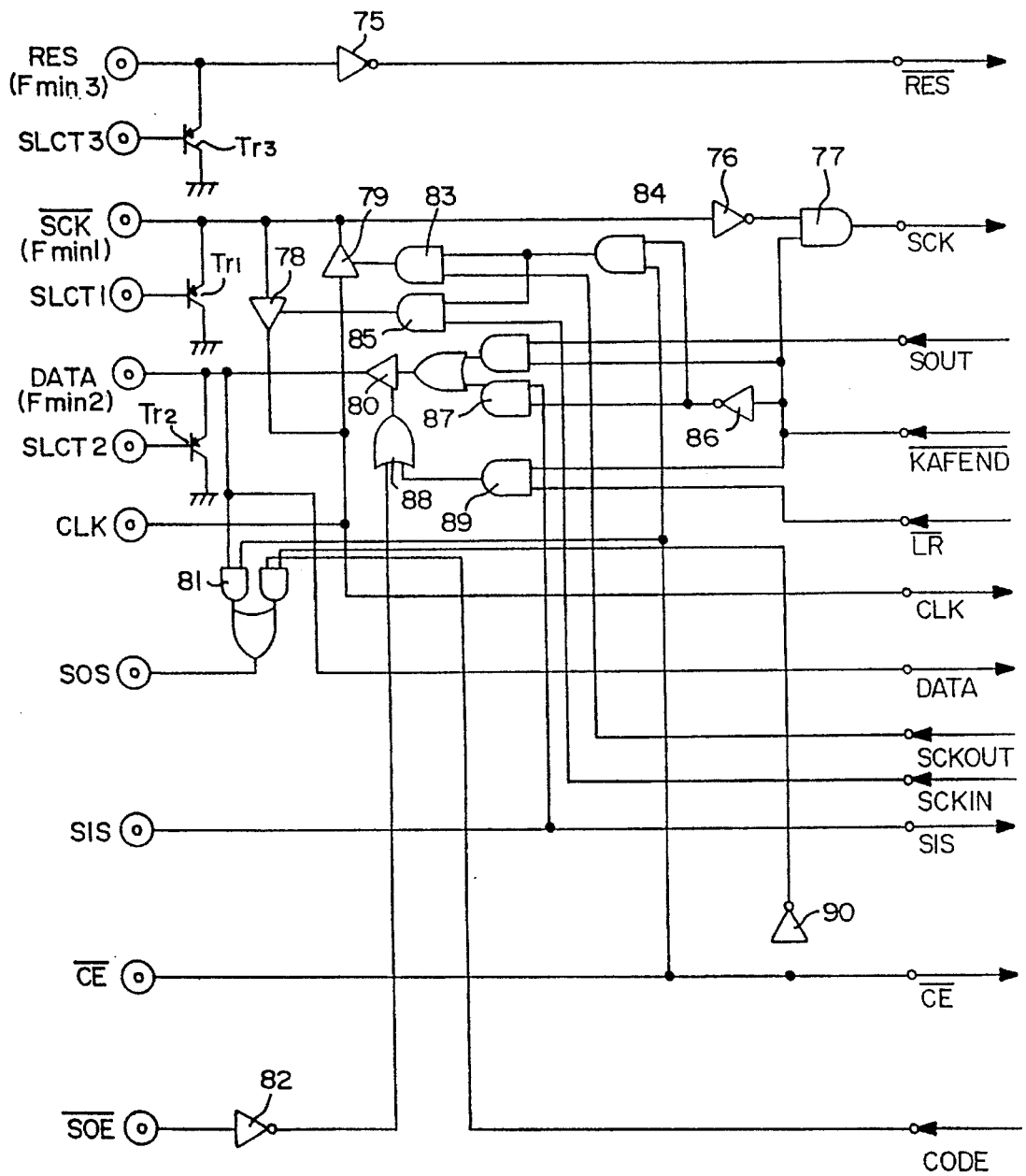
FIG. 5 is a block diagram of an I/O block of a lens interface circuit shown in FIG. 1.

The following description will be directed to the construction of the I/O block 50, with reference to FIG. 5.

The I/O block 50 has a terminal RES connected to the terminal P12 of the indication CPU 11 of the camera body 1, a terminal $\overline{SCK}$ connected to the terminal P10, and a terminal DATA connected to the terminal P11. The terminal RES is also connected to the terminal $\overline{RES}$ through an inverter 75. An emitter of a transistor Tr3 is connected to a line between the terminal RES and the inverter 75. A base of the transistor Tr3 is connected to the terminal SLCT3 and a collector of the transistor Tr3 is grounded. The reset signal is sent to the terminal RES from the indication CPU 11.

The terminal $\overline{SCK}$ connected to one of the inputs of the AND gate 77, an input of a tristate buffer 78, and an output of a tristate buffer 79. The output of the AND gate 77 is connected to the output SCK. The output of the tristate buffer 78 and the input of the tristate buffer 79 are connected to the terminal CLK and the output CLK. The other input of the AND gate 77 is connected to the input $\overline{KAFEND}$.

The emitter and the base of the transistor Tr1 are connected to a line between the terminal $\overline{SCK}$ and the inverter 76, and the terminal SLCT1, respectively. The collector of the transistor Tr1 is grounded.

The terminal DATA is connected to an output of a tristate buffer 80, one of a pair of inputs of a multiplexer 81, and the output DATA. The output of the multiplexer 81 is connected to the terminal SOS.

The clock terminal, the terminal SOS, the terminal SIS, the terminal $\overline{CE}$ and the terminal $\overline{SOE}$, connected to the lens CPU 30 will be described below.

The terminal CLK is connected to the output CLK, the output of the tristate buffer 78, and the input of the tristate buffer 79. The terminal CLK transmits and receives the clock pulses to and from the $\overline{SCK}$ terminal of the lens CPU 30. The output CLK receives the serial clock signal from the indication CPU 11 or from the lens CPU 30.

The tristate buffers 78 and 79 having opposite directions are connected in parallel between a portion between the terminal CLK and the output CLK and a portion between the terminal $\overline{SCK}$ and the inverter 76. Consequently, the connection and disconnection between the terminal $\overline{SCK}$ and the output CLK and between the terminal CLK and the terminal $\overline{SCK}$ can be selectively controlled by the control lo of the tristate buffers 78 and The control input of the tristate buffer 79 is connected to the output of the AND gate 83. One of a pair of inputs of the AND gate 83 is connected to the output of the AND gate 84 and the other input thereof is connected to the input SCKOUT. The inputs of the AND gate 84 are connected to the input $\overline{KAFEND}$ through the inverter 86 and to the terminal $\overline{CE}$, respectively.

The terminal SOS is connected to the output of the multiplexer 81. The data inputs of the multiplexer 81 are connected to the terminal DATA and the terminal CODE, respectively. Accordingly, the data from the indication CPU 11, the macro code plate 42 and the distance code plate 36 is selectively output.

The control inputs of the multiplexer 81 are connected to the terminal $\overline{CE}$ and the terminal $\overline{CE}$ through the Inverter 90, respectively. Consequently, the switching of the input of the multiplexer 81 is controlled by the level of the terminal $\overline{CE}$. Namely, when the level of the terminal $\overline{CE}$ is L, the data of the input CODE is output to the terminal SOS, and when the level of the terminal $\overline{CE}$ is H, the data of the terminal DATA is output from the terminal SOS.

The data output from the terminal SO of the lens CPU 30 is input to the terminal SIS. The terminal SIS is connected to the output SIS and the other data input of the multiplexer 87. Accordingly, the terminal SIS is selectively connected to the terminal DATA between the terminal DATA and the input SOUT by the multiplexer 87. The output SIS is connected to the input SIS of the 8 bit buffer 57. Consequently, the data output from the terminal SO of the lens CPU 30 is sent directly to the terminal DATA and to the terminal DATA through the 24 bit shift register 56.

The terminal $\overline{CE}$ is connected not only to one control input and the other control input of the multiplexer 81 through the inverter 90, but also to the other Input of the AND gate 84. Consequently, the terminal $\overline{CE}$ functions as a selection terminal to select the data from the photographing lens 2 to the camera body 1 from among the data of the macro code plate 42 and the distance code plate A36, the data through the 24 bit shift register 56, and the data output from the lens CPU 30.

The terminal $\overline{SOE}$ is connected to the input of the OR gate 88 through the inverter 82. The terminal $\overline{SEO}$ functions as a control terminal to control the output of the tristate buffer 80 at the communication other than the old communication.

The levels of the various terminals which function in the initial state, the old communication state and the new communication state will be described below.

Figure 10:
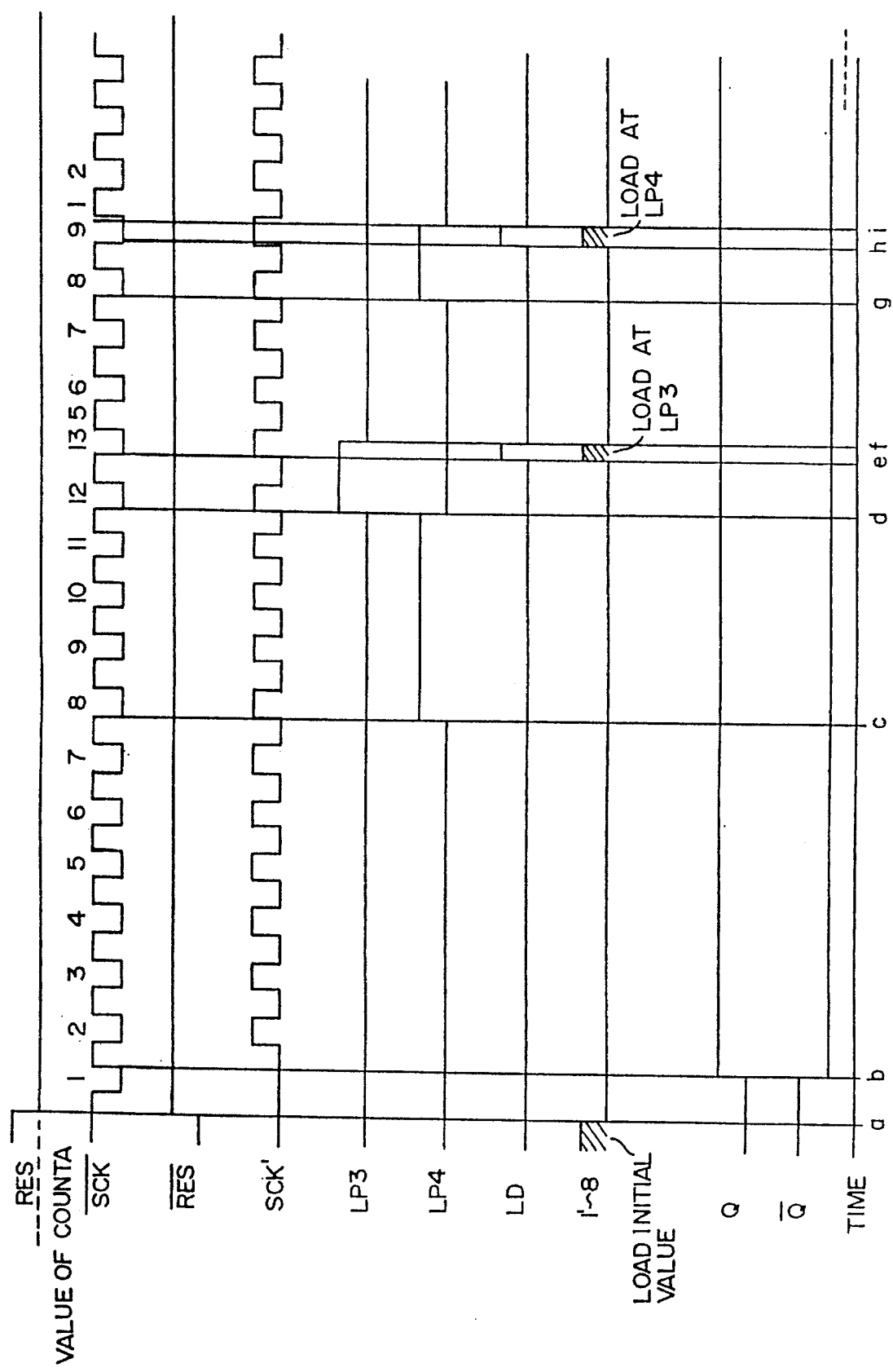
FIG. 10 is a timing chart of data loading operations of a shift register.

In the initial state, the levels of the reset terminal RES and the serial clock terminal $\overline{SCK}$ are maintained H by the indication CPU 11 (see the state before the time a in FIG. 10). In this state, the initial data of the distance code plate A36 and the macro code portion 42, etc., are loaded in the 24 bit shift register 56.

At the commencement of the old communication, the reset pulse of level L is output from the reset terminal RES. The lens CPU 30 performs the initialization in response to the reset pulse. At this moment, the initial value set in the initial value setting register 52 is loaded in the 24 bit shift register 56 (time a in FIG. 10).

Thereafter, the levels of the terminal $\overline{CE}$ and the terminal $\overline{SOE}$ become L, the clock pulse from the lens CPU 30 is output to the terminal CLK, and the clock pulse from the indication CPU 11 is output to the output SCK. During the old communication, the levels of the input, $\overline{KAFEND}$, the input $\overline{LR}$ and the terminal SCKOUT are H. In this state, the data output to the input SOUT is output from the terminal DATA.

Upon completion of the transfer of the data for 16 bytes, the level of the input $\overline{LR}$ is L, so that the connection of the input SOUT and the terminal DATA is broken. During the disconnection, if the rear converter is mounted, the data from the rear converter is output to the indication CPU 11.

After the time for data transfer for 19 bytes lapses, the level of the input -KAFEND becomes L, the clock pulses output from the camera body into the output SCK are interrupted.

Reset Circuit

Figure 6:
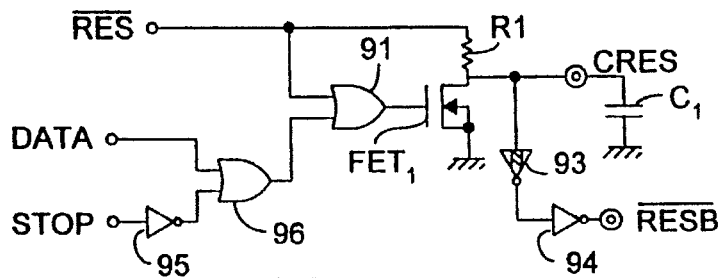
FIG. 6 is a view of a reset circuit of a lens interface circuit shown in FIG. 4.

The arrangement of the reset circuit 68 will be described below in more detail with reference to FIGS. 6 and 7.

The input $\overline{RES}$ and the input DATA of the reset circuit 68 are connected to the terminal $\overline{RES}$ and the terminal DATA of the I/O block 50, respectively. The input STOP of the reset circuit 68 is connected to the output Q of the stop signal generating circuit 69. The output $\overline{RESB}$ of the reset circuit 68 is connected to the terminal $\overline{RESET}$ of the lens CPU 30 and the output CRES is grounded through the delay condenser C1.

The input $\overline{RES}$ is also connected to the terminal CRES through one of a pair of inputs of the NAND gate 91 and a pull-down resistance R1. The output of the NAND gate 91 is connected to the gate of a MOS field effect transistor FET1, a drain of which is connected to a line between the resistance R1 and the output CRES. The source of the field effect transistor FET1 is grounded. The line between the resistance R1 and the output CRES is connected to the output terminal $\overline{RESB}$ through a Schmidt inverter 93 and an inverter 94 connected in series thereto.

The input terminal DATA and the input terminal STOP are connected to one of a pair of inputs of the OR gate 96 and the other input of the OR gate 96 through an inverter 95, respectively. The output of the OR gate 96 is connected to the other input of the NAND gate 91.

Figure 7:
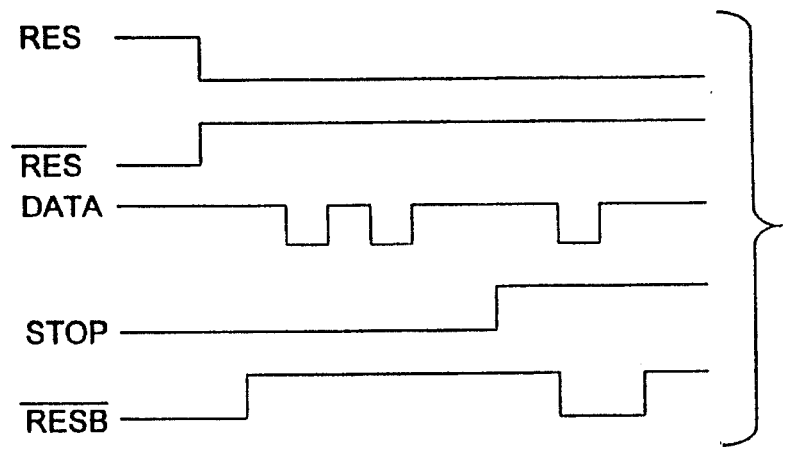
FIG. 7 is a timing chart of operations of a reset circuit shown in FIG. 6.

The timing chart of the reset circuit 68 will be explained below (FIG. 7). At the initial state, the levels of the terminal RES and the terminal DATA are both H, and the levels of the input terminal $\overline{\text{RES}}$, the input STOP and the output $\overline{\text{RESB}}$ are all L.

When the level of the terminal RES (terminal Fmin3) is made L by the indication CPU 11, the output $\overline{\text{RES}}$ is inverted by the inverter 75 and becomes level "H." As a result, the level of the input CRES becomes H, and the level of the output $\overline{\text{RESB}}$ is made H through the Schmidt inverter 93 and the inverter 94.

In this state, even if the level of the input DATA falls, the level of the OR gate 96 is maintained at H, and the level of the NAND gate 91 is maintained at L, so that the field effect transistor FET1 is maintained OFF. Consequently, the level of the output $\overline{\text{RESB}}$ is held to be H.

If the input DATA falls to L when the input STOP (the output Q of the stop signal generating circuit 69) is H, the levels of the OR gate 96 and the NAND gate 91 are changed to L and H, so that the field effect transistor FET1 is turned ON, and accordingly, the level of the output $\overline{\text{RESB}}$ is changed to L. As a result, the lens CPU 30 is reset.

24 Bit Shift Register

Figure 9:
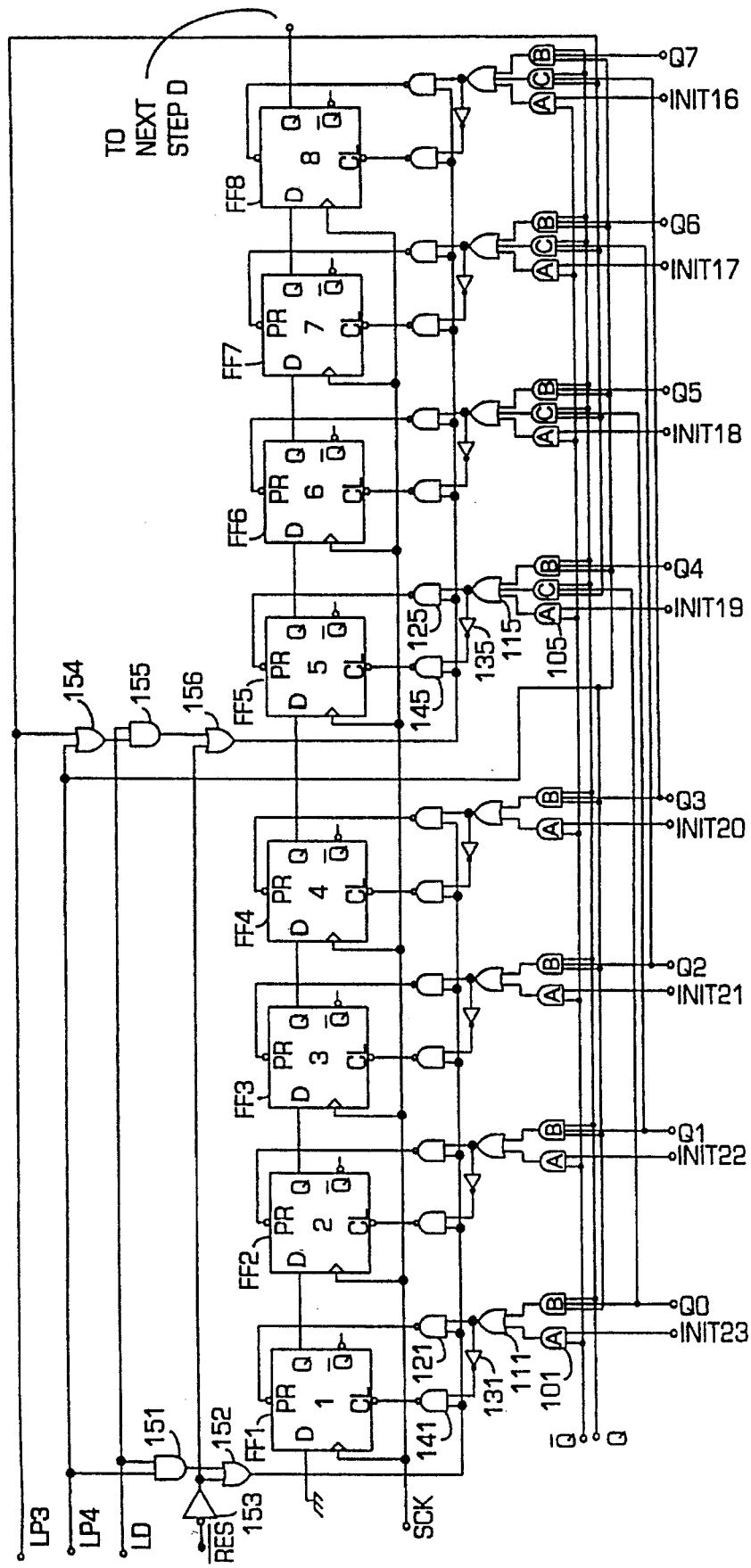
FIG. 9 is a diagram of first eight steps of a shift register and a data loading circuit in a lens interface.

The following discussion will be addressed to the construction and the loading operation of the data loading circuit 55 and the 24 bit shift resistor 56, with reference to FIGS. 8 and 9 and Table 6. The flip-flops FF1 through FF8 in FIG. 9 are flip-flops of the first eight bits corresponding to No. 1 through No. 8 flip-flops in FIG. 8.

The reset pulse is input to the terminal $\overline{\text{RES}}$ from the indication CPU 11 through the terminal $\overline{\text{RES}}$ of the I/O block 50.

The serial clock pulse is input to the terminal SCK' from the terminal SCK of the I/O block 50 through the first clock pulse cancellation circuit 65.

The terminal $\overline{\text{Q}}$ and the terminal Q are connected to the output $\overline{\text{Q}}$ and the output Q of the initial value/8 bit buffer switching circuit 64, respectively.

The input D of the first flip-flop FF1 is grounded, and the inputs of the 2nd through 8th flip-flops FF2 through FF8 are connected to the outputs Q of the preceding flip-flops FF1 through FF7, respectively. The initial value of the output Q is level L, since the input D of the first flip-flop FF1 is grounded.

The data pulses are input to the inputs PR (preset inputs) of the flip-flops FF1 through FF8 from the data loading circuit 55, and the clear pulse is input to the inputs CL (clear inputs) to latch the data (level) of the inputs PR (preset inputs).

The flip-flops FF1 through FF8 perform the shift operations when the clock pulse input from the terminal SCK' rises.

The surroundings of the flip-flops FF2 through FF4 are similar to those of the first flip-flop FF1, and the surroundings of the flip-flops FF5 through FF8 are similar to those of the fifth flip-flop FF5. Accordingly, only the surroundings of the first and fifth flip-flops FF1 and FF5 are described below.

The bit data of a unit of one byte is Input into the inputs PR (reset inputs) of the flip-flops FF from the corresponding outputs Q0 through Q7 through the logical gate group. The data of the initial value setting register 52 and the outputs Q0 through Q7 of the 8 bit buffer 57 are input to the preset inputs of the flip-flops FF1 through FF8 through the logical gates, respectively.

TABLE 6

| | INPUT | | | | | | The data to be loades to 24 bit flip-flop "—" indicates the data not to be loaded | | | | | | | | |
|---|---|---|---|---|---|---|---|---|---|---|---|---|---|---|---|
| | Q | $\overline{\text{Q}}$ | RES | LD | LP3 | LP4 | 1 | 2 | 3 | 4 | 5 | 6 | 7 | 8 | REMARKS |
| a | 0 | 1 | 0 | 0 | 0 | 0 | INIT 23 | INIT 22 | INIT 21 | INIT 20 | INIT 19 | INIT 18 | INIT 17 | INIT 16 | The initial value is loaded |
| b | 0 | 1 | 1 | 0 | 0 | 0 | — | — | — | — | — | — | — | — | Not loaded |
| c | 1 | 0 | 1 | 0 | 0 | 0 | — | — | — | — | — | — | — | — | |
| d | 1 | 0 | 1 | 0 | 0 | 1 | — | — | — | — | — | — | — | — | |
| e | 1 | 0 | 1 | 0 | 1 | 0 | — | — | — | — | — | — | — | — | |
| f | 1 | 0 | 1 | 1 | 0 | 0 | — | — | — | — | Q0 | Q1 | Q2 | Q3 | The calculated data is loaded to LP3 |
| g | 1 | 0 | 1 | 0 | 0 | 0 | — | — | — | — | — | — | — | — | Not loaded |
| h | 1 | 0 | 1 | 0 | 0 | 1 | — | — | — | — | — | — | — | — | |
| i | 1 | 0 | 1 | 1 | 0 | 1 | Q0 | Q1 | Q2 | Q3 | Q4 | Q5 | Q6 | Q7 | The calculated data is loaded to LP4 |
| j | 1 | 0 | 1 | 0 | 0 | 0 | — | — | — | — | — | — | — | — | Not loaded |
| : | 1 | 0 | 1 | : | : | : | : | : | : | : | : | : | : | : | |
| n | 1 | 0 | 1 | 1 | 0 | 0 | — | — | — | — | — | — | — | — | The calculated data is loaded to either LP0, LP1 or LP2. |
| : | 1 | 0 | 1 | : | : | : | : | : | : | : | : | : | : | : | |

The load point pulses (H level) are selectively output to the terminals LP3 and LP4 when the data of the 8 bit buffer 57 is loaded on the load point LP3 or LP4 of the 24 bit shift resistor 56 from the load point decoder 59.

Upon loading, the load pulse (level H) is output to the terminal LP from the load pulse generating circuit 61 through the OR gate 63.

One of the Inputs of the AND gate 101A of the first stage is connected to the terminal $\overline{\text{Q}}$ and the other input is connected to the terminal INIT23 which is an output terminal of the initial value setting register, respectively. Consequently, the AND gate 101A outputs the initial value data of the terminal INIT 23 to the flip-flop FF1.

The three inputs of the other AND gate 101B of the first stage are connected to the terminal LP4, the terminal Q0 and the terminal Q, from the left side, respectively. Consequently, the AND gate 101B outputs the data of the terminal Q0 to the flip-flop FF1.

One of the inputs of the AND gate 105A of the fifth stage is connected to the terminal $\overline{Q}$, as is the one input of the AND gate 101A, and the other input is connected to the terminal INIT19 which is a data output terminal of the initial value setting register 52, respectively. Consequently, the AND gate 105A outputs the initial value data of the terminal INIT 19 to the flip-flop FF5.

The three inputs of the AND gate 105B of the fifth stage are connected to the terminal LP4, the terminal Q4 and the terminal Q, in this order from the left side, respectively. Consequently, the AND gate 105B outputs the data of the terminal Q4 to the flip-flop FF5.

The three inputs of the AND gate 105C are connected to the terminal LP3, the terminal Q0 and the terminal Q, in this order from the left side, respectively. Consequently, the AND gate 105C outputs the data of the terminal Q0 to the flip-flop FF5.

As can be seen from the above discussion, the AND gates 101A and 105A load the initial value data on the flip-flops FF1 and FF5. Similarly, the AND gate 101B loads the data of Q0 on the flip-flop FF1, and the AND gates 105B and 105C load the data of Q4 and Q0 on the flip-flop FF5, respectively.

Thus, the reset circuit loads the initial value data of 24 bits on the corresponding flip-flops and loads the data of Q0 through Q8 of the 8 bit buffer 57 on positions shifted in the right hand direction by 4 bits, respectively.

The outputs of the AND gates 101A and 101B are connects d to the inputs of the OR gate 111, respectively. Accordingly, when one of the outputs of the AND gates 101A and 101B becomes H, the level of the output of the corresponding OR gate 111 becomes H.

The outputs of the AND gates 105A, 105B and 105C are connected to one of the inputs of the OR gates 115, respectively. Accordingly, when one of the outputs of the AND gates 105A, 105B and 105C becomes It, the level of the output of the corresponding OR gate 115 becomes H.

The output of the OR gate 111 is connected to one of the inputs of the NAND gate 121 and one of the inputs of the NAND gate 141 through the inverter 131. The other inputs of the NAND gates 121 and 141 are connected to the output of the OR gate 152. The output of the NAND gate 121 is connected to the preset input PR and the output of the NAND gate 141 are connected to the input CL.

Similarly, the output of the OR gate 115 is connected to one of the inputs of the NAND gate 125 and one of the inputs of the NAND gate 145 through the inverter 135. The other inputs of the NAND gates 125 and 145 are connected to the output of the OR gate 156. The outputs of the NAND gates 125 and 145 are input to the present input PR and the input CL of the flip-flop FF5, respectively.

Consequently, when the level of the output of the OR gate 152 is H and the level of the output of the OR gate 111 is H, the level of the output of the NAND gate 121 is L and the data of level H is loaded in the flip-flop FF1.

Furthermore, when the level of the output of the OR gate 152 is H and the level of the output of the OR gate 111 is L, the level of the output of the NAND gate 141 is L and the data of the terminal INIT 23 is loaded in the flip-flop FF1.

Conversely, when the level of the output of the OR gate 156 is H and the level of the output of the OR gate 115 is H, the level of the output of the NAND gate 125 is L and the data of level H is loaded in the flip-flop FF5.

Furthermore, when the level of the output of the OR gate 156 is H and the level of the output of the OR gate 115 is L, the level of the output of the NAND gate 145 is L and the data of the INIT 19 is loaded in the flip-flop FF5.

The terminal LP3 is connected to one of the inputs of the AND gate 105C and one of the inputs of the OR gate 154. The other input of the OR gate 154 is connected to the terminal LP4. Accordingly, when one of the terminals LP3 and LP4 is H, the output of the OR gate 154 is H.

The output of the OR gate 154 is connected to one of the inputs of the AND gate 155 and the other input of the AND gate 155 is connected to the terminal LD. Consequently, the level of the output of the AND gate 155 becomes H and L when the level of one of the outputs of the terminal LP3 or LP4 is H and when the level of the terminal LD is H, respectively.

The output of the AND gate 155 is connected to one of the inputs of the OR gate 156 and the other input of the OR gate 156 is connected to the terminal $\overline{RES}$ through the inverter 153. The output of the OR gate 156 is connected to one of the inputs of the NAND gates 125 and 145, as mentioned above.

The terminal LP4 is connected to one of the inputs of the AND gate 151, one of the inputs of the OR gate 154, one of the inputs of the AND gate 105B and one of the inputs of the AND gate 101B.

The terminal LD is connected to the other inputs of the AND gate 151 and AND gate 155.

The terminal $\overline{RES}$ is connected to one of the inputs of the OR gates 152 and 156 through the inverter 153.

The terminal SCK' is a clock terminal which is connected to the clock inputs of the flip-flops FF1 through FF8 in order to perform the shift operation.

The terminals Q and $\overline{Q}$ are connected to one of the inputs of the AND gates 101A and 105A and to one of the inputs of the AND gates 101B, 105B and 105C to selectively load or initialize the data, respectively.

Loading of Data in Course of Old Communication

The loading operation of the data by the loading circuit shown in FIG. 9 in the course of the old communication will be described below with reference to FIG. 10 which shows a timing chart of the loading operation.

Since the levels of the terminals RES, $\overline{SCK}$, and $\overline{Q}$ are H at the initial stage, the initial data of the terminals INIT23~INIT16 are loaded on the flip-flops FF1~FF8.

When the level of the terminal RES falls to L and when the level of the terminal $\overline{RES}$ rises to H, the loading of the initial data is completed (time a).

Thereafter, the serial clock signal from the camera body 1 is output from the terminal $\overline{SCK}$. The UP/DOWN counter 58 begins counting the SCK clock pulses.

The first SCK cancellation circuit 65 cancels the first clock pulse of the input SCK clock pulses and outputs the clock pulses subsequent to the first clock pulse as SCK' clock pulses to the 24 bit shift register 56. The flip-flops FF begin the shifting operation in accordance with the SCK' clock pulses.

As a result, the level of the $\overline{RES}$ clock pulse input into the input CL of the initial value/8 bit buffer switching circuit 64 becomes H, and accordingly, the $\overline{SCK}$ clock pulse rises.

Consequently, the outputs Q and $\overline{Q}$ are inverted, so that the levels of the output Q and the output $\overline{Q}$ become H and L, respectively. Thus, the data of Q0–Q7 of the 8 bit buffer 57 can be loaded (time b).

When the seven SCK' pulses are input to the flip-flops FF, the flip-flops FF1 through FF8 are vacant. When the counted value of the UP/DOWN counter 58 is seven, the load pulse generating decoder 59 rises the LP4 pulse to hold It at level H in accordance with the falling of the eighth $\overline{SCK}$ clock pulse. In this state, when the carrying signal is output from the octal counter 71, the LD load pulse of level H Is output through the load pulse generating circuit 61, so that the data of Q0–Q7 of the 8 bit buffer 57 are loaded on the flip-flops FF1–FF8, respectively.

In the illustrated embodiment, since the 8 bit buffer 57 is not full in this state, no carrying signal is output from the octal counter 71, so that no data of the 8 bit buffer 57 is loaded.

The output of the $\overline{SCK}$ clock pulse continues and the initial data is shifted. When the twelfth $\overline{SCK}$ clock pulse falls, the load pointing decoder 59 causes the LP4 and LP3 pulses to fall and rise (time d), respectively. As a result, the data of Q0–Q3 can be loaded in the flip-flops FF5–FF8. Note that the data Q4–Q7 is able to be loaded in the flip-flops preceding the flip-flop FF8.

When the 8 bit buffer 57 is full, so that the carrying pulse is output from the octal counter 71, the load pulse is output from the load pulse generating decoder 60, and accordingly, the LD load pulse rises. As a result, the data Q0–Q3 are loaded in the flip-flops FF5–FF8 (time e). Consequently, a decrement of the counted value of the UP/DOWN counter 58 by 8 takes place, so that the value is changed to 5 from 13.

When four $\overline{SCK}$ clock pulses are output and the counted value of the UP/DOWN counter 58 changes from 7 to 8, the LP4 pulse rises in accordance with the fall of the SCK clock pulse, so that the data can be .loaded at the load point LP4 (time h).

The output of the LD pulse causes the carrying pulse to be generated from the octal counter 71 to load the data of Q0–Q7 in the flip-flops FF1–FF8 (time i).

The hardware operations mentioned above are repeated to first load the initial data of 3 bytes on the 24 bit shift register 56, so that the data is serially output from the 24 bit shift register 56 while being shifted by 1 bit to be transferred to the camera body 1 (the indication CPU 11) through the terminal DATA.

During the loading and shifting of the initial data, the lens CPU 30 performs a predetermined arithmetic operation. When the arithmetic data of a unit of one byte is loaded from the 8 bit buffer 57 into the 24 bit shift register 56, so that the data is transferred to the camera body 1 from the 24 bit shift register 56, subsequent to the initial data.

Upon completion of the transfer of the initial data of 3 bytes and the arithmetic data of 13 bytes, the $\overline{LR}$ pulse of level L is output from the rear converter signal generating circuit 66 so as to break the connection between the terminal SOUT and the terminal DATA. If the rear converter is mounted, the data of 3 bytes of the rear converter is transferred to the camera body 1 synchronously with the clock signal of the lens CPU 30 after the connection is broken.

Upon transfer of the rear converter data of 3 bytes, the old communication completion $\overline{KAFEND}$ pulse of level L is output from the $\overline{KAFEND}$ signal generating circuit 67 to complete the old communication. Note that the lens CPU 30 does not operate until a time for transferring data for 19 bytes lapses, even if no rear converter is mounted.

When the $\overline{KAFEND}$ pulse is output as the old communication completion signal (the lens CPU 30 to which received the completion signal is ready for a new communication). When the lens CPU 30 receives an old and new communication switching command output from the indication CPU 11, the lens CPU 30 outputs the acknowledgement signal and performs another operation.

In the illustrated embodiment, although the initial value data which does not require the arithmetic operation is three bytes, it can be two bytes, four bytes or more. It is possible to use a shift register other than the 24 bit shift register 56, corresponding to or not corresponding to the initial value data. For instance, a 16 bit shift register or a 32 bit shift register can be used instead of the 24 bit shift register.

The basic operations of the camera system of the present invention will be described below in detail.

Timer Routine of Indication CPU

Figure 12:
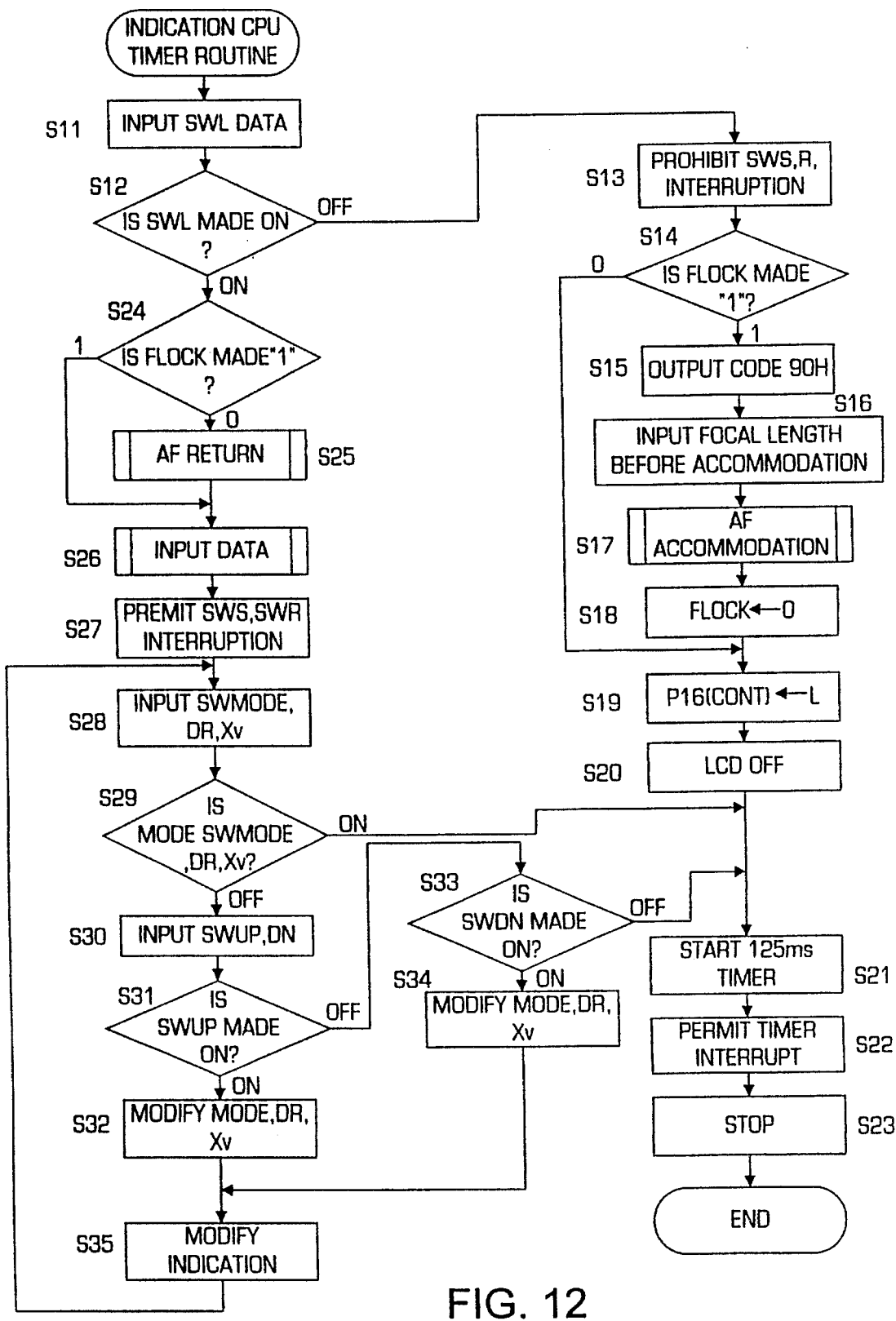
FIG. 12 is a flow chart of operations of an indication CPU of a camera body.

First, the main operation (timer routine) of the indication CPU 11 will be explained with reference to FIG. 12. The main operation is performed by the indication CPU 11 in accordance with a program stored in the internal ROM 11a of the indication CPU 11.

The indication CPU 11 checks whether the lock switch SWL is turned ON or OFF at steps S11 and S12. If the lock switch SWL is turned OFF, the interruption of the operation by the switch is prohibited (step S13), and then, the state of the lock flag FLOCK is checked to determine if the lens is in the retracted position (step S14).

Usually, in a photographing lens, the whole length of the lens is varied in accordance with the focusing and zooming operations. Therefore, when no picture is taken, it is preferable to reduce the whole length of the photographing lens to be as short as possible in order to realize a compact and portable camera.

To this end, in the camera system of the present invention, the photographing lens 2 is automatically retracted to reduce the whole length thereof by the automatic focusing mechanism and the power zoom mechanism when the lock switch SWL is turned OFF.

However, a photographer makes the lock switch SWL OFF also when he or she does not intend to retract the photographing lens in the camera. For instance, the lock switch SWL may be turned OFF to reduce the power consumption when a photographer waits for the next shot while maintaining the focal length and focal point as they are. In such a case, if the photographing lens is automatically retracted when the lock switch SWL is turned OFF, the focal length and focal point vary, so that the photographer must troublesomely readjust the focal length and focal point.

To prevent this, in the camera system according to the present invention, when the lock switch SWL is switched from ON to OFF, the focal length and the focal point at that time are memorized and then, the photographing lens is retracted. When the lock switch SWL is turned ON again, the focal length and the focal point before the retraction of the photographing lens are automatically obtained, regardless of the photographer's intention when the lock switch SWL is turned OFF. Thus, according to the present invention, the problem mentioned above can be eliminated.

In the camera system of the present invention, the retraction and return operations with respect to the automatic focusing mechanism are carried out by the main CPU 10, and the retraction (accommodation) and return operations with respect to the power zoom mechanism are carried out by the lens CPU 30, respectively. Note that the main CPU 10 and the lens CPU 30 are supplied with the electrical power only when they operate, otherwise no power is supplied thereto. Therefore, the data of the retraction and the return is controlled by the indication CPU 11 which always operates. The transmission of the data, not including the initial data, and the commands between the lens CPU 30 and the indication CPU 11 is affected by the new communication.

The lens retraction (accommodation) operation is affected at steps S15 through S18. Since the zooming operation is controlled by the lens CPU 30, the code 90H for the accommodation command is sent to the lens CPU 30 and the focal length data, before the accommodation, is input from the zoom code plate 37 to the lens CPU 30. The automatic focusing operation which is controlled on the camera body side is performed by the main CPU 10 in an AF accommodation sub-routine at step S17.

Upon completion of the accommodation, the lock flag FLOCK is removed (step S18), and the control proceeds to step S19. If the lens has been already accommodated or retracted, since the lock flag FLOCK is 0, the control skips step S15 through step S18.

At step S19, the terminal P16 (terminal CONT) falls to L and then the power source of the lens CPU 30 and the LCD 12 are turned OFF (step S20). Thereafter, the timer routine is performed at 125 ms cycle (steps S21 through S23). Namely, the intermittent operation by the timer operation is repeated during the period in which the lock switch SWL is OFF.

If the lock switch SWL is turned ON during the operation at step S12, the indication CPU 11 judges the state of the lock flag FLOCK at step S24. If FLOCK is 0, the AF return operation is performed by the main CPU 10 to return the focal point of the photographing lens to one before the accommodation (retraction).

At step S26, the kind of the attached lens is judged in accordance with the input data. If necessary and if possible, the lens CPU 30 performs the return of the zoom mechanism.

Upon completion of the data input operation, the interruption of the control by the photometer switch SWS and the release switch SWR is permitted, so that the release can be effected. Thereafter, the control proceeds to step S28.

When the mode switch SWM, the drive switch SWDR, the exposure correction switch SWXV and the up-down switch SWUP/DN are actuated, the changing operation of the mode, etc., and the indication operation of the selected mode are performed at steps S28 through S35.

If none of these switches is actuated, or if the switching operation is finished, the intermittent operation is performed in accordance with the timer operation at steps S21 through S23.

Input Operation of Lens Data

Figure 11:
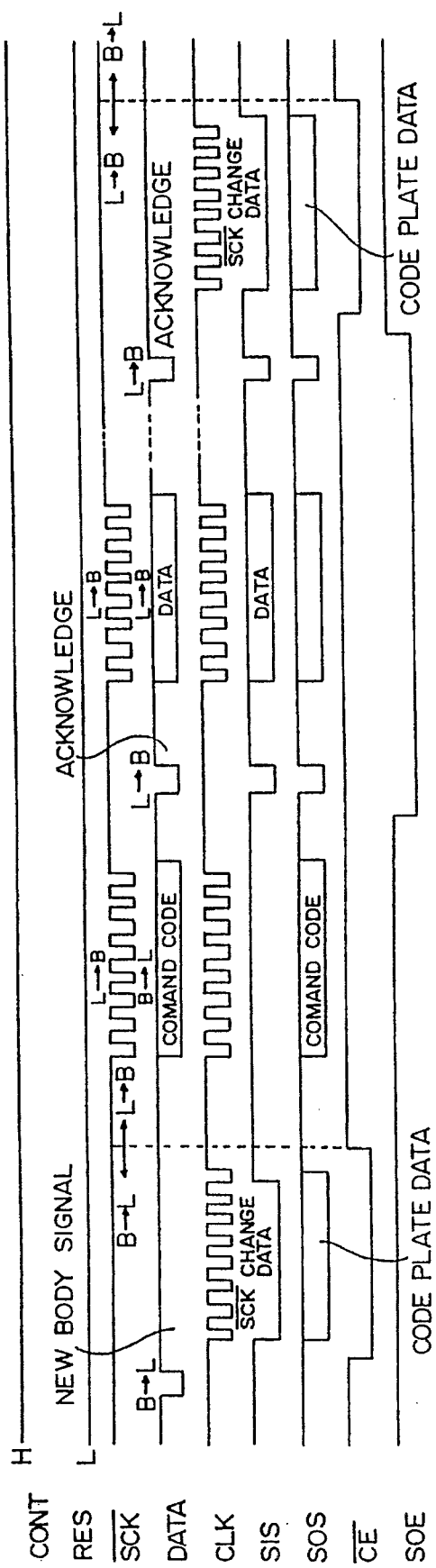
FIG. 11 is a timing chart of data communication of a camera system according to the present invention.
Figure 13A:
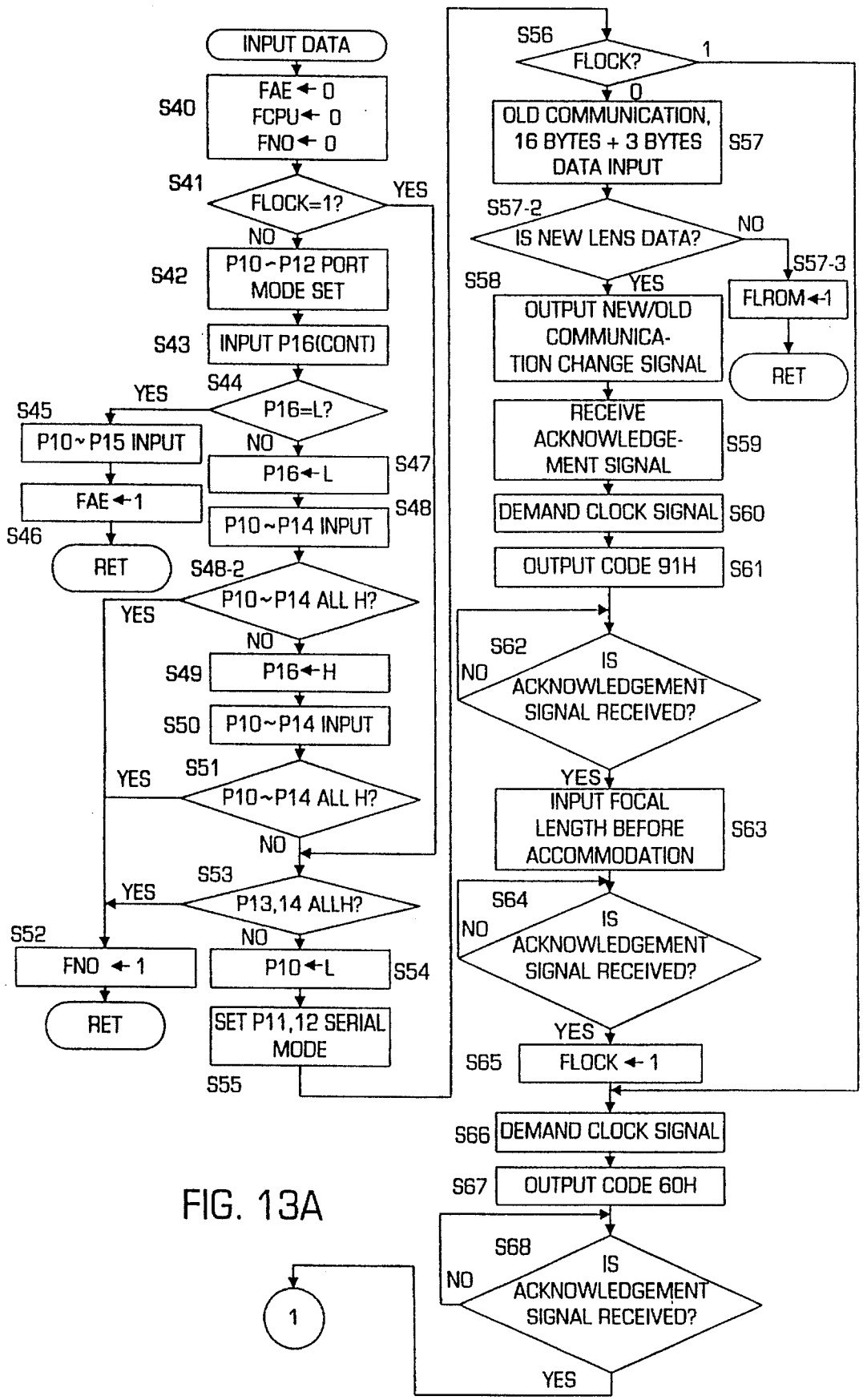
FIGS. 13A, 13B and 13C are flow charts of data input communication of an indication CPU of a camera body.
Figure 13B:
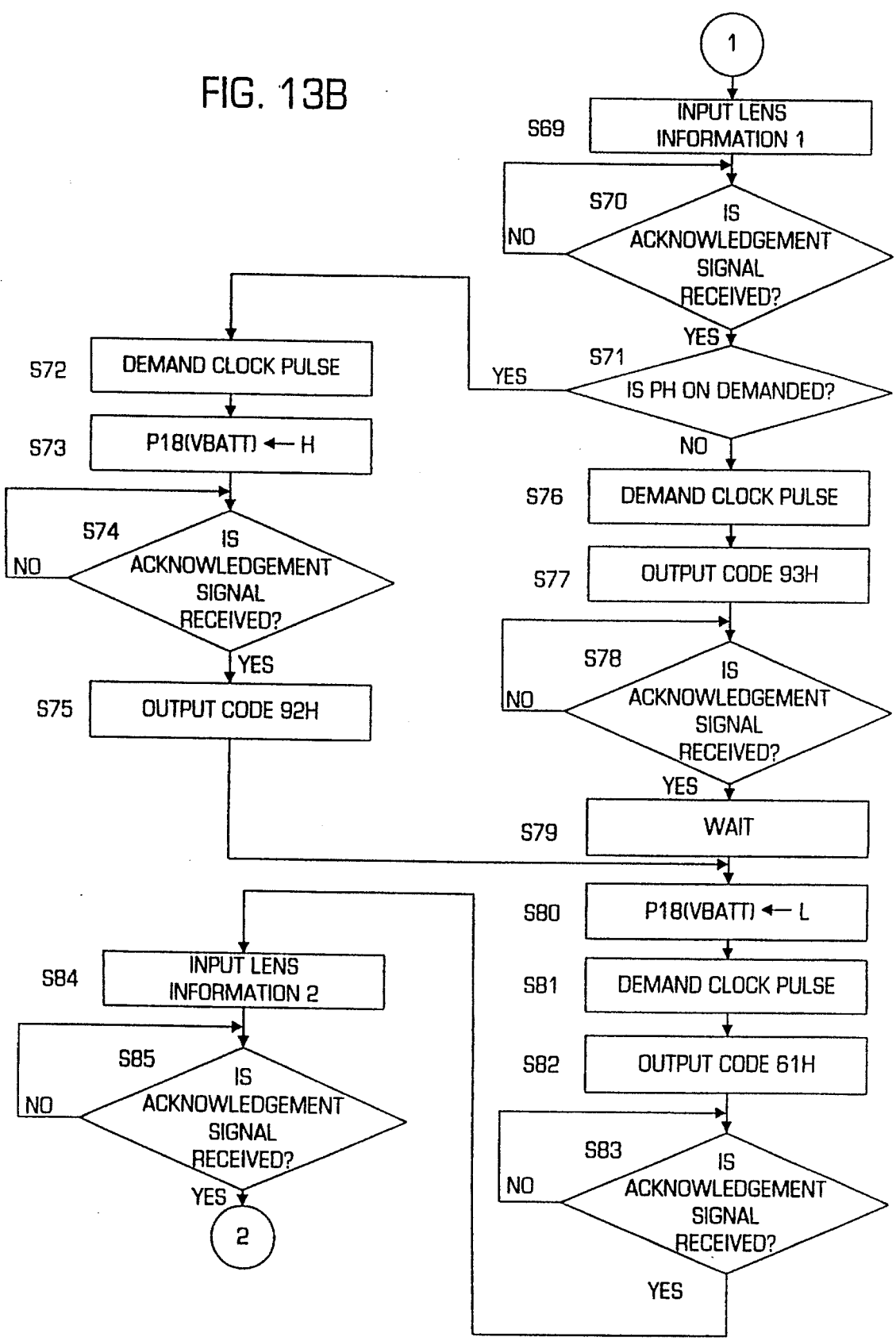
Figure 13C:
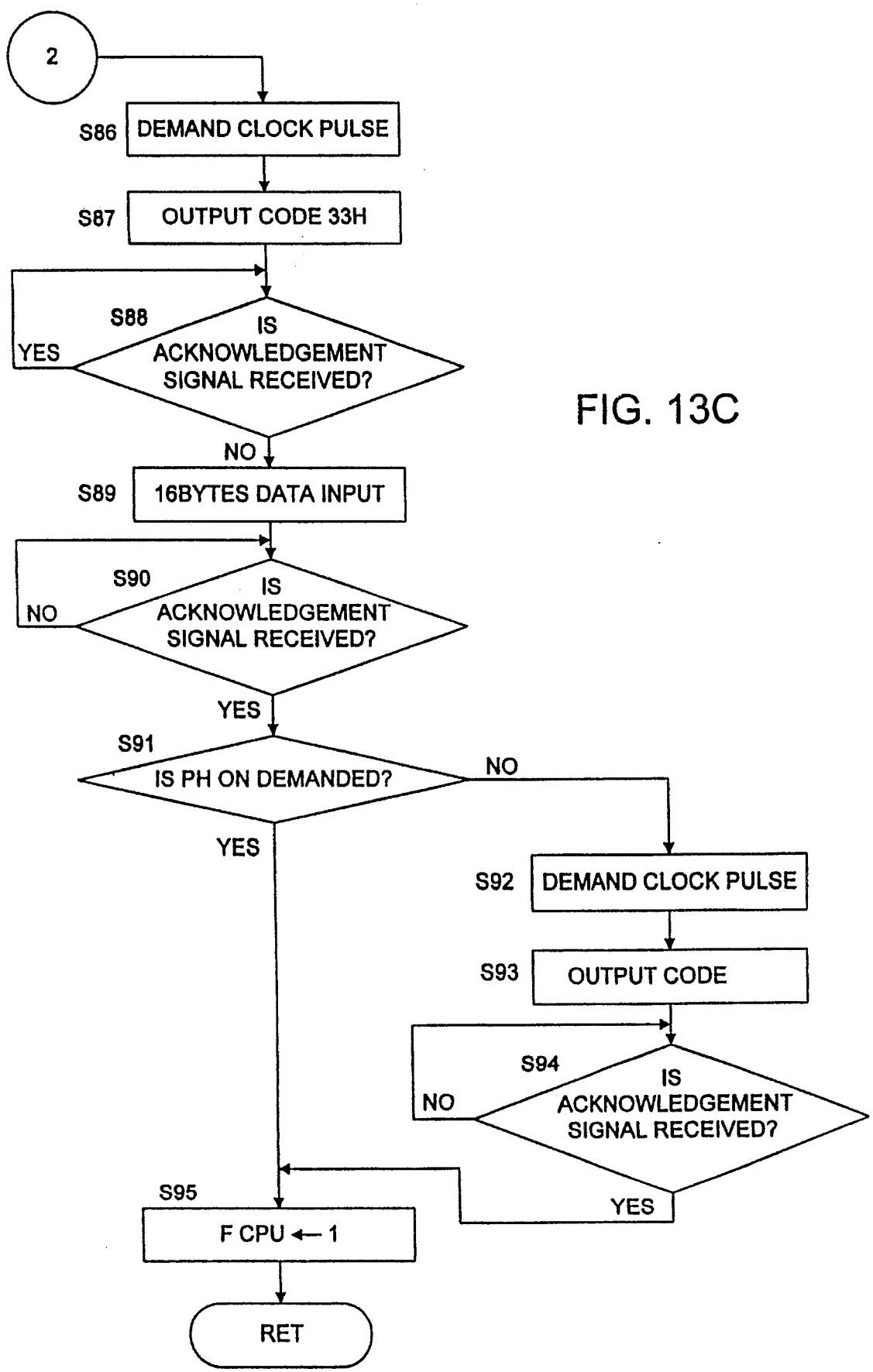

The sub-routine for the input operation of the lens data which is called at step S26 of the timer routine will be described below with reference to FIGS. 11 and 13. The input operation is performed by the indication CPU 11.

First, three lens flags FAE, FCPU and FNO for discriminating the lens are reset to 0 (step S40). The lens flag F AE discriminates a conventional (old) AE lens having a lens RON, the lens flag FCPU a new AE lens having a lens CPU, for example, the photographing lens 2 having the lens CPU 30 shown in FIGS. 1 and 3, etc., and the lens flag FNO a manual lens having no lens CPU, respectively.

After that, whether or not the lock flag FLOCK is 1 is checked at step 41. If FLOCK is 0, the control proceeds to step S42. Conversely, if FLOCK is 1, the control jumps to step S52.

At step S42, the terminals P10 through P12 which are used for serial communication with the photographing lens 2 are set at the input mode, and then, the level of the terminal P16 (the contact Cont) is input and checked (steps S43 and S44).

If there is no contact Cont on the mounted lens side, the contact Cont on the camera body side comes into contact with the surface of the lens mount and is accordingly grounded to detect that the mounted lens is an old AE lens.

When the mounted lens is the old AE lens, the levels of the terminals P10 through P15 are input to read the data on the open F number and the minimum F number and the diaphragm A/N switching data, and the old AE lens flag FAE is made 1 (steps S45 and S46). Then, the control is returned.

If no photographing lens is mounted or if a lens having the lens data is mounted, the level of the Cont contact is H. Consequently, the level of the terminal P16 falls to L to stop the supply of the electrical power to the lens side. Thereafter, the levels of the other terminals P10 through P14 are input (step S48).

At this moment, all the levels of the terminals P10 through P14 are checked to determine whether or not they are all H. If the levels are all H, then the no lens flag FNOL, which represents a normal lens having no CPU, is set (Steps S48-2 and S52). Thereafter, the control is returned.

Figure 3:
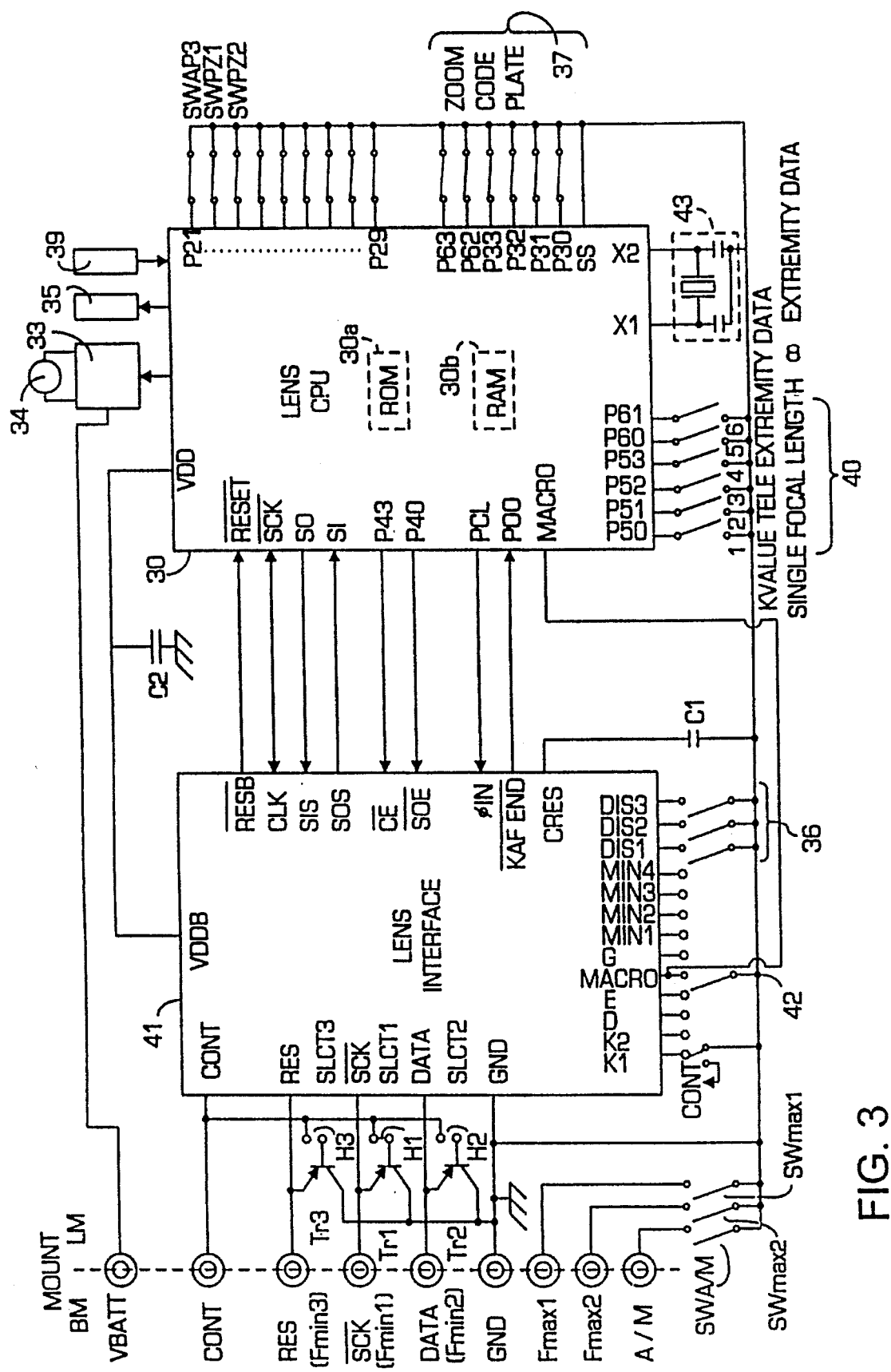
FIG. 3 is a block diagram of a main circuit arrangement of a photographing lens shown in FIG. 1.

As can be seen in FIG. 3, when the transistors Tr are connected to the lens contacts Fmin1 through Fmin3, the open F number can be detected in accordance with the levels of the lens contacts Fmin1 through Fmin3 in combination, depending on the state (ON and OFF) of the transistors Tr in combination. The maximum F number can be detected in accordance with the levels of the lens contacts Fmax1 and Fmax2 in combination, depending on the state (ON and OFF) of the switches SWFmax1 and SWFmax2 in combination. The level of the diaphragm A/M contact is used to detect whether the diaphragm is automatic or manual.

Thereafter, the level of the terminal P16 becomes H to supply the lens side with the power thereby to activate the lens CPU. After that, the levels of the terminals P10 through P14 are input (steps S49 and S50). Whether the levels of the terminals P10 through P12 are all H is checked at step S51. If the levels of P10, P11 and P12 are all H, the normal lens flag FNO, which represents a normal lens having no lens CPU, is made 1 at step S52. Thereafter, the control is returned.

If any of the levels of the terminals P10, P11 and P12 is L, it is checked to see if both the levels of the terminals P13 and P14 are H at step S53. If both the levels of the terminals P13 and P14 are H, then the normal lens flag FNO is made 1 (step S52), since it is then considered that there is trouble with the lens CPU. The control is then returned.

If at least one of the terminals P13 and P14 is L, the level of the terminal P10 falls to L (step 554), and the terminals P11 and P12 are set at the serial communication mode (step S55), since the mounted lens is a new AE lens (e.g. the photographing lens). Thereafter, the control proceeds to step S56.

At step S56, the lock flag FLOCK is checked to determine if it is 1 or not. If FLOCK is 0, the control proceeds to step S57, and if FLOCK is 1, the control jumps to step S66.

At step S57, the lens data of 16 bytes and the rear converter data of three bytes are input by the old communication.

When the input of the data by the old communication is completed, the body CPU 11 checks whether the lens connected to the body is the lens with the lens CPU 30 or not. If not, which means that the lens is a common AE lens, the flag FLROM is set (Steps S57-2 and S57-3). Thereafter, the control is returned.

When the input of the data by the old communication is completed, the new/old communication switching signal is output from the terminal DATA (step S58), so that the clock demand signal is output to the lens side in response to the acknowledgement signal issued from the lens side, whereby the lens CPU 30 outputs the clock signal (steps S59 and S60).

Thereafter, the lens return command code 91H is sent to the lens CPU 30 which is ready for returning the power zoom mechanism at step S61. The control waits until the acknowledgement signal is issued from the lens CPU 30 (step S62).

Upon receipt of the acknowledgement signal, the focal length data, before accommodation, is sent to the lens CPU 30 which then performs the power zooming (step S63). When the power zooming is finished, which can be detected by the issuance of the acknowledgement signal from the lens CPU 30, the lock flag FLOCK is made 1 (steps S64 and S65). Thereafter, the control proceeds to step S66.

At step S66, the clock demand signal is output, so that the lens CPU 30 outputs the clock signal. The command code 60H is output synchronously with the clock signal, and the control does not proceed until the acknowledgement signal is issued (steps S67 and S68). The command code 60H is used to read lens information including the switch setting data on the lens side and the power hold demand signal, etc.

Upon receipt of the acknowledgement signal, the lens information output from the lens CPU 30 is received (step S69). The completion of the receipt of the lens information is detected by the receipt of the acknowledgement signal fed from the lens CPU 30 (step S70).

Upon receipt of the acknowledgement signal, whether or not the transferred data demands the power hold is checked at step S71. If there is a power hold demand, the lens CPU 30 is requested to output the clock signal (step S72). Thereafter, the level of the terminal P18 becomes H and the control does not proceed until the acknowledgement signal is issued from the lens CPU 30 (steps S73 and S74).

Upon receipt of the acknowledgement signal, the power hold-ON code 92H is output (step S75). Thereafter, the control proceeds to step S75.

If there is no power hold demand at step S71, the output of the clock signal is demanded at step S76. Thereafter, the power hold-OFF code 93H is output synchronously with the clock signal (step S77). After that, whether or not the acknowledgement signal is output from the lens CPU 30 is checked at step S78.

Upon receipt of the acknowledgement signal, the level of the terminal P18 becomes L after a lapse of a predetermined time (steps S79 and S80) to stop the supply of the power to the PZ motor 34. Then, the control proceeds to step S81.

At step S81, the output of the clock signal is demanded. The demand code 61H for demanding the lens information 2 is output synchronously with the clock signal at step S82. Thereafter, whether or not the acknowledgement signal is output is checked at step S83.

If the acknowledgement signal is received, the subsequent lens information 2 is then received at step S84. Thereafter, whether or not the acknowledgement signal is output is checked at step S85.

If the acknowledgement signal is received at step S85, the clock signal is demanded at step S86. The demand code 33H for demanding all the data is output synchronously with the clock signal at step S87. Thereafter, whether or not the receipt acknowledgement signal is received is checked at step S88.

If the receipt acknowledgement signal is received, the subsequent data for 16 bytes is input at step S89. Thereafter, whether or not the transmission completion acknowledgement signal is received is checked at step S90.

If the transmission completion acknowledgement signal is received at step S90, whether or not there is a power hold demand is checked at step 91. If there is a power hold demand, the new AE lens flag FCPU is made 1 (step S95), and then, the control is returned.

Conversely, if there is no power hold demand at step S95, the clock signal is demanded at step S92 and a predetermined code is output (step S93). Thereafter, whether or not the receipt acknowledgement signal is received is checked at step S94.

Main Routine of Lens CPU

The lens CPU 30 starts when the reset circuit 68 releases the reset after the levels of the terminal Cont and the contact Fmin1 are made H by the indication CPU 11.

The lens CPU 30 performs the initialization after the Interruption by all of the operations is prohibited (steps S100 and S101).

After the Initialization is completed, whether or not the old communication completion signal is output from the lens interface 41 is checked, that is, whether or not the level of the terminal $\overline{\text{KAFEND}}$ is L is checked at step S102. If the old communication completion signal is output, the stop flag FSTOP is made 1, and then, the lens CPU interruption starts (step S103).

Conversely, if no old communication completion signal is output, which means that the control is still during the old communication, the states of the switches are input and stored in the RAM to successively perform the predetermined arithmetic operations (step S105). During these operations, the initial value data is loaded in the 24 bit shift register 56 in which the data is shifted and serially output to the indication CPU 11.

Every time the predetermined arithmetic operations are finished, the results of the arithmetic operations (arithmetic data) are output to the lens interface 41 (step S106). The arithmetic data output to the lens interface 41 is then loaded In the 24 bit shift register 56 by hardware and successively transferred to the indication CPU 11 through the I/O block 50, as mentioned above.

If the rear converter is provided, the data for 3 bytes is also transferred to the indication CPU 11 from the rear converter. When the transfer of the data for 19 bytes in total, including the initial data for 3 bytes, the arithmetic data for 16 bytes and the rear converter data for 3 bytes is completed, the lens interface 41 outputs the old communication completion signal.

Upon completion of the output of the arithmetic data to the indication CPU 11, whether or not the old communication completion signal is output is checked at step S107.

When the old communication completion signal is received, the new/old communication switching signal is input from the indication CPU 11 (step S108) and the acknowledgement signal is issued (step S109). This transfers the old communication to a new communication.

In the new communication, the levels of the terminals P23 through P29 are input at step S110, and the states of the switches are memorized in the internal RAM 30$b$ (step S111).

Thereafter, the state of the power zoom switch SWPZ1 is checked to check the power zoom mode or the manual zoom mode at step S112. If the power zoom switch SWPZ1 is turned OFF, the mode is the manual zoom mode, so that the power hold demand bit (flag) is made 0 to stop the supply of the power to the PZ motor 34. Thereafter, the control proceeds to step S116.

If the power zoom switch SWPZ1 is turned ON, the mode is the power zoom mode, and accordingly, the levels of the terminals P21 through P29 are Input to check the states of the switches relating to the zooming operation (step S114). If the levels of all of the terminals P21 through P29 are H, since no operation for the power zooming is effected, the power hold demand bit is made 0. Thereafter, the control proceeds to step S116.

If the level of any of the terminals P21 through P29 is L, since the switch connected to the associated terminal relating to the power zooming is turned ON, the power hold demand bit is made 1 to supply the PZ motor 34 with the power (step S115). Thereafter, the control proceeds to step S116.

At step S116, the constant image magnification flag FCONST is made 0 and then, the control proceeds to step S117. The constant image magnification flag FCONST detects whether or not the constant image magnification mode is set. In the illustrated embodiment, the constant image magnification mode referred to means a mode in which when an object Of an object distance D is in focus at a specific focal length f, even if there is a small change ΔD in the object distance, the power zooming is controlled to adjust the focal length f' to thereby satisfy the following relationship;

$$D/F=(D+\Delta D)/f'$$

At step S117, whether or not the power zoom switch SWPZ2 is turned ON is checked. If the power zoom switch SWPZ2 is turned ON, the constant magnification flag FCONST is made 1, and then, the control proceeds to step S119. Conversely, if no power zoom switch SWPZ2 is turned ON, the control directly proceeds to step S119 without making the constant magnification flag FCONST 1.

After that, at step S119, the serial interruption is permitted. Thereafter, the timer operation is set to intermittently perform the routine of steps S110 through S122 (steps S120 and S121) at 125 ms cycle. Thereafter, the operation stops at step S122. The lens CPU 30 performs the operations of steps S110 through S122 for every 125 ms in accordance with the setting of the timer operation.

Serial Interruption of Lens CPU

Figure 15A:
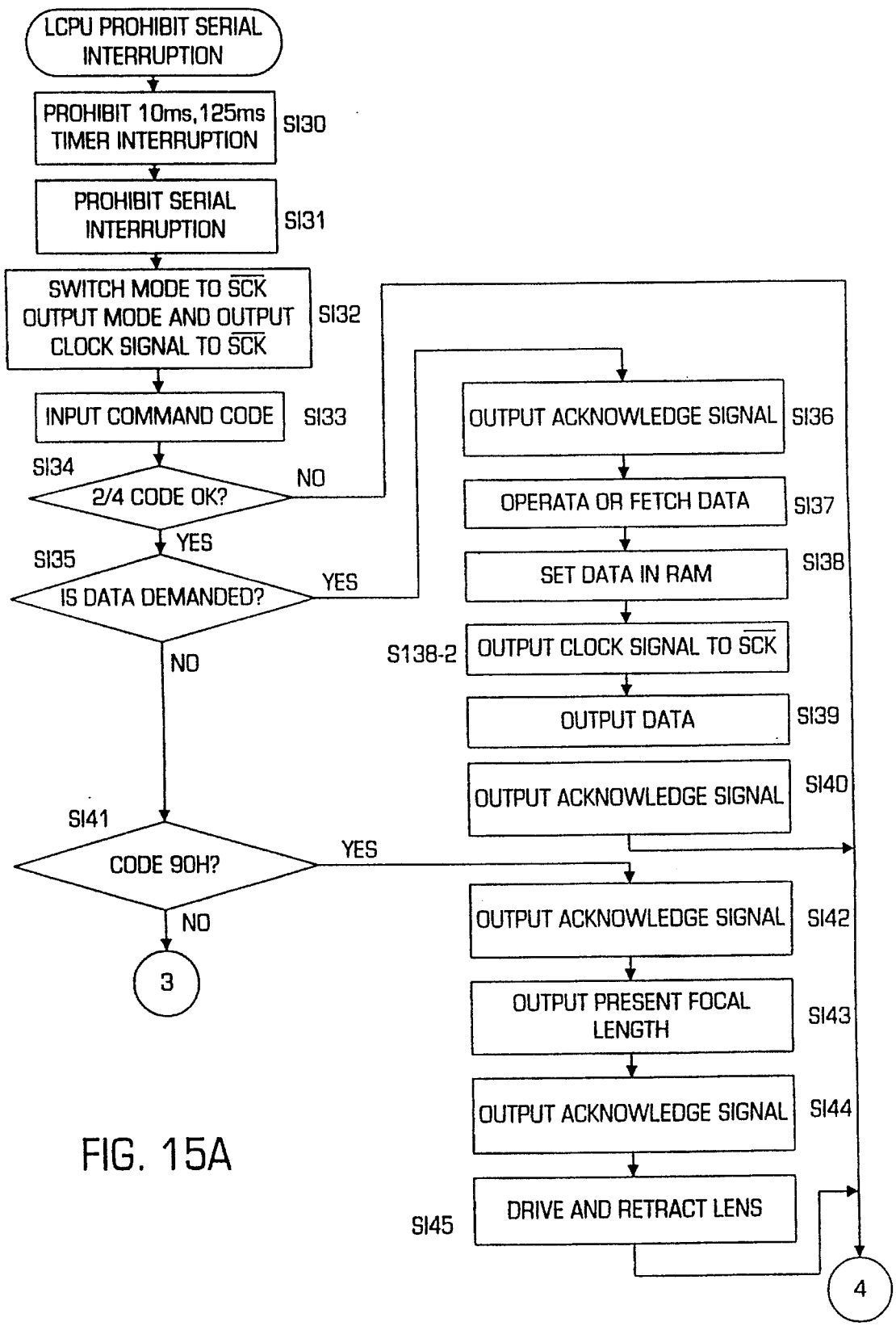
Figure 15B:
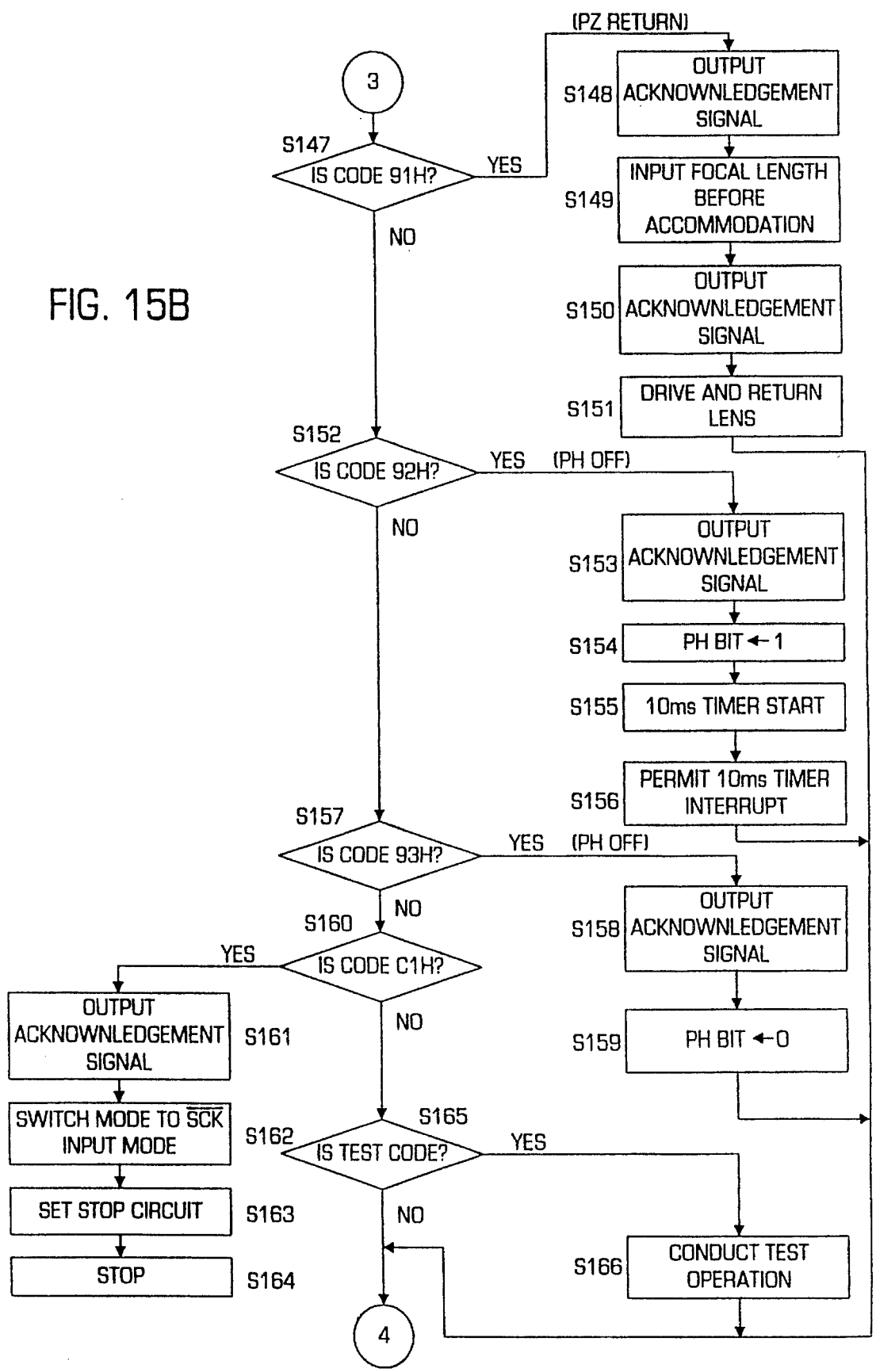

FIG. 15 shows a flow chart for the new communication operation when the serial communication is interrupted by the indication CPU 11 of the camera body 1. When the indication CPU 11 causes the level of the terminal DATA to fall to L, the lens CPU 30 enters the new communication operation.

First, the lens CPU 30 prohibits the timer interruption by the 10 ms timer and the 125 ms timer and the serial interruption (steps S130 and S131). Note that the 10 ms timer interruption is a power zoom control operation in which when the serial interruption is permitted, the power zooming is controlled at an interval of 10 ms.

Thereafter, the mode is switched to the $\overline{SCK}$ output mode in which the clock signal is output from the lens CPU 30 to output the serial clock signal to the terminal $\overline{SCK}$ (step S132). The communication with the camera body 1 is carried out synchronously with the clock signal output from the photographing lens 2.

At step S133, the command code from the indication CPU 11 is input.

Figure 14:
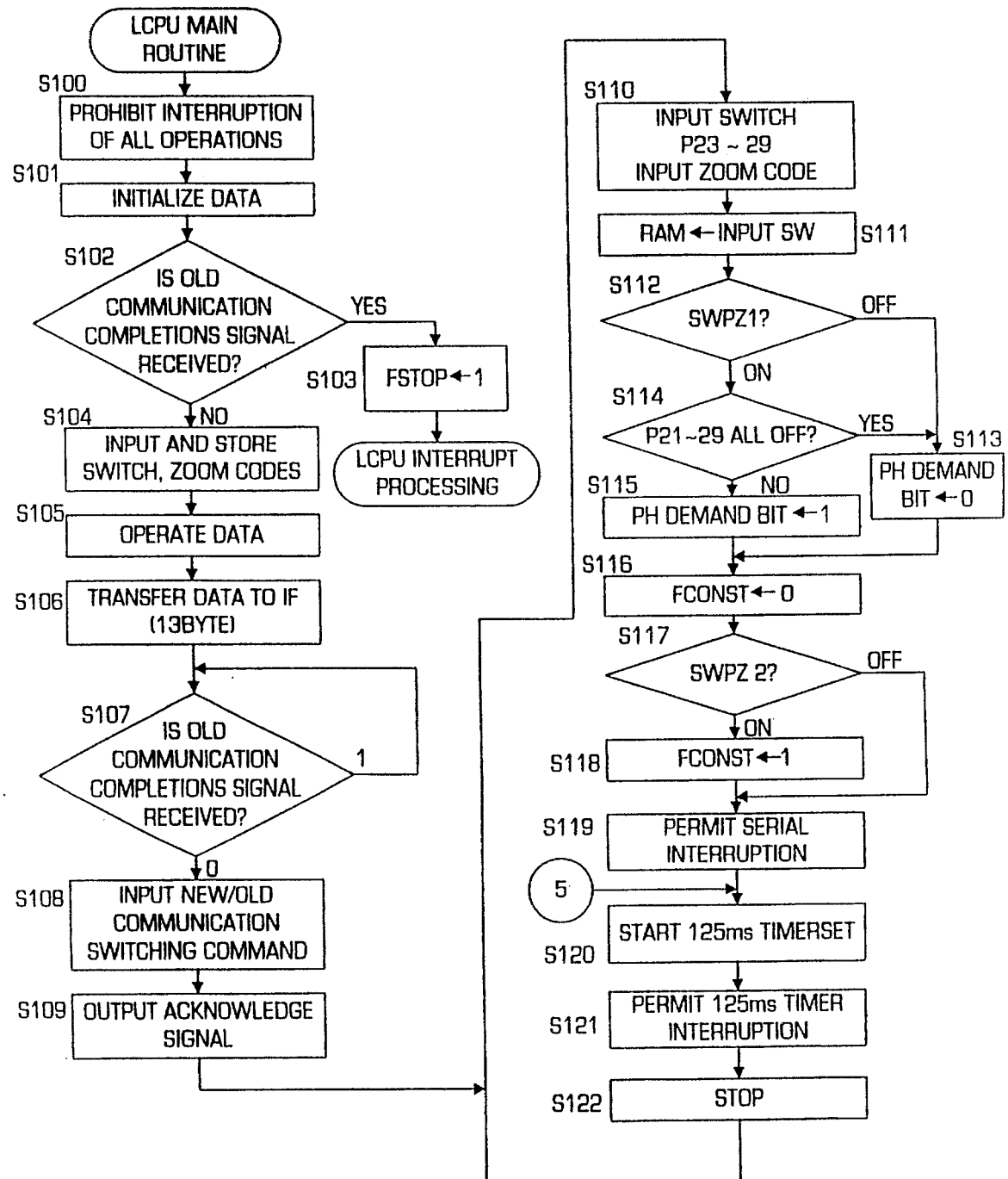
FIG. 14 is a flow chart of the main operation of a CPU of a photographing lens; and, FIGS. 15A, 15B and 15C are flow charts of a serial interruption for data communication of a CPU of a photographing lens.
Figure 15C:
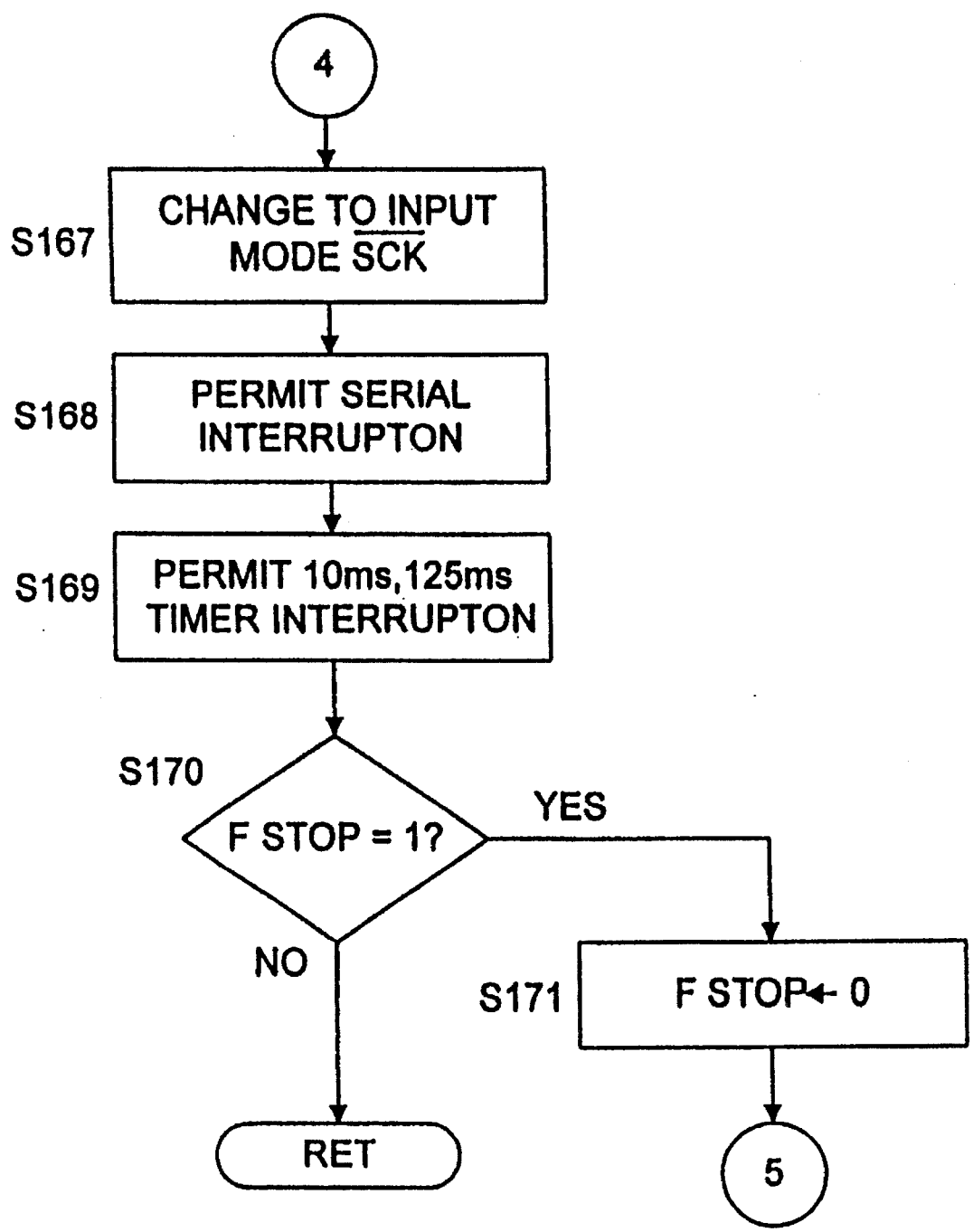

Thereafter, whether or not the 2/4 code of the command code input is correct is checked at step S134. The 2/4 code means first four bits of which two bits are always H and the remaining bits (two bits) are always L. If these requirements are not satisfied, no operation is performed is an input error of the command code and the control jumps to step S167. At step S167, the mode is switched to the $\overline{SCK}$ input mode in which the serial clock is input from the camera body side, as shown in FIG. 15C. Thereafter, the 10 ms timer interruption and the 125 ms timer interruption and the serial interruption are permitted (steps S168 and S169). At step S170, if the stop flag FSTOP is 0, the control is directly returned and if the stop flag FSTOP is 1, the control is returned to step S120 of the CPU main routine shown in FIG. 14 after the stop flag FSTOP is made 1 (step S171).

If the 2/4 code is correct, whether or not the command code is the data demand .signal is checked at step S135. If the command code is the data demand signal, the acknowledgement signal is output to calculate the demanded data or to input the data of the code plate and the switches etc., to memorize the data into the internal RAM (steps S136 through S138).

The memorized data is serially output synchronously with the $\overline{SCK}$ clock signal at step S139. Upon completion of the output of the memorized data, the acknowledgement signal is output to complete the data transfer (steps S138-2, S139 and S140). Thereafter, the control proceeds to step S167.

If the first four bits are not the command code, then the code is checked to see if it is 90H, 91H, 92H, 93H, the sleep code or the test code (steps S141 through S147, step S152, step S157, step S160 and step S165).

If the command code is the code 90H (lens accommodation), the acknowledgement signal is sent to the indication CPU 11 (step S142). Thereafter, the present focal length data is sent from the zoom code plate 37 to the indication CPU 11 (step 5143). Upon completion of the feed of the focal length data to the indication CPU 11, the acknowledgement signal is output to accommodate or retract the photographing lens (steps S144 and S145). Thereafter, the control proceeds to step S167 (FIG. 15C).

If the command code is the code 91H (lens return), the receipt acknowledgement signal is sent to the indication CPU 11 (step S148). Thereafter, the focal length data before accommodation is input from the indication CPU 11 (steps S149). Upon completion of the input of the focal length data before accommodation, the acknowledgement signal is output to finish the input of the focal length data before accommodation (step S150). Thereafter, the PZ motor 34 is driven to set the focal length to be the focal length before accommodation at step S151. Thereafter, the control proceeds to step S167.

If the command code is the code 92H (power hold OFF), the receipt acknowledgement signal is output at step S153. Thereafter, the power hold demand bit PHbit is made 1 (step S154), and the 10 ms timer starts to permit the 10 ms timer interruption (steps S155 and S156). Thereafter, the control proceeds to step S167.

If the command code is the code 93H (power hold OFF), the acknowledgement signal is output (steps S157 and S158), and the power hold bit is made 0 (step S159). Thereafter, the control proceeds to step S167.

If the command code is none of the codes 90H, 91H, 92H and 93H, then it is checked to see if it is the sleep code C1H at step S160. If the command code is the sleep code C1H, the receipt acknowledgement signal is output to change the mode to the $\overline{SCK}$ input mode in which the level of the terminal $\overline{CE}$ falls to L (steps S161 and S162). Thereafter, the STOP signal generating circuit 69 is set at step S163, and then, the control stops (step S164). The sleep code C1H is set to be the second bit of one byte signal, so that when the second bit is H, the sleep code C1H is obtained.

If the command code is not the sleep code C1H, whether the command code is the test code FXH is checked at step S165. If the command code is the test code FXH, the test operation is performed at step S166, and then, the control proceeds to step S167. If the command code is not the test code FXH, the control skips step S166 to step S167. The test mode is not used during the taking of a picture, but used to effect a predetermined data communication without mounting the photographing lens to the camera body, for example upon assembly of the lens or adjustment thereafter, etc.

At step S167, the mode is changed to the $\overline{SCK}$ input mode in which the clock signal can be received from the indication CPU 11. Thereafter, the serial interruption, the 10 ms timer interruption and the 125 ms timer interruption are permitted (steps S168 and S169).

Thereafter, at step S170, whether or not the stop flag FSTOP is 1 is checked. If FSTOP is 1, it is made 0 (step S171). The control is returned to step S120 of the main routine of the lens CPU. Conversely, if FSTOP is 0 at step S170, the control is returned.

As can be understood from the above discussion, according to the present invention, since the lens CPU can set the data asynchronously with the clock signal of the camera body, it is not necessary to set the data at a constant interval determined by the camera body.

Furthermore, since the initial data of the lens is set by hardware into the shift register 56 of the lens interface 41 and is successively output therefrom, the lens CPU 30 can perform the necessary arithmetic operations during the set and output of the initial data of the lens, thus resulting in a reduction of the time necessary for transfer of the lens data.

It is possible to mount a conventional lens or an old AE lens to the camera body 1 to which the present invention is applied to take a picture. It is also possible to mount the photographing lens 2 to a conventional camera body.

As can be seen from the above discussion, according to the present invention, since the input and output means for setting the lens data asynchronously with the clock signal of the camera body is provided in the photographing lens, the data can be set independently of the time determined by the control means of the camera body.

In addition, even if the camera body is an old type, dissimilar to the herein disclosed invention, having the system for interchanging information with the lens above, the lens can transfer initial value lens data and certain calculated initial value lens data to the camera body through an input and output means. The camera body applied in this invention can also be attached to an old type of photographing lens.

According to the example of the invention, information can be transferred by serial communication in accordance with the clock signals output from a camera body in the same way as before. Besides, when the circuit installed in the lens interface 41 is not being operated, it is possible to interchange information between lens CPU 30 and camera body 1 (indication CPU 11), and it is also possible to calculate data and withdraw some specific data to be transferred to the camera body in accordance to the order of the camera body.

The photographing lens in the example comprises an information processing means, an input and output means which determines lens data without regard to the clock signals output by the clock means of the camera body, and a switching means which enables the camera body to interchange information with the photographing lens without passing through the input and output means. The camera body in the example comprises an information processing means which interchanges information not only with the herein disclosed photographing lens through the input and output means but also with an old type of photographing lens by having direct contact with Its information processing means. Therefore, the time for Interchanging data can be reduced as only some of the specific data can be transferred. The burden on the camera body is therefore reduced due to the fact that the information processing means installed in the photographing lens plays some of the roles that the information processing means installed in the camera body used to deal in by the order of the camera body.

As the camera body can be used with a former type of photographing lens, and the photographing lens can also be used with a former type of camera body, they have a high potential for general use.

We claim:

1. A camera system having a camera body and a photographing lens, said photographing lens comprising:
    a shift register that stores data related to said photographing lens, said data stored in said shift register comprising:
        specific initial value lens data; and
        data other than specific initial value lens data;
    means for transmitting said data stored in said shift register to said camera body in response to clock pulses issued by said camera body;
    first means for loading said specific initial value lens data in said shift register in response to a predetermined signal issued by said camera body;
    means for calculating said data other than specific initial value lens data in response to clock pulses issued by said photographing lens; and
    second means for loading said data other than specific initial value lens data in said shift register in response to said clock pulses issued by said photographing lens after said specific initial value lens data is loaded in said shift register by said first loading means,
    said camera body comprising:
    interfacing means for functionally coupling said camera body to said photographing lens when said photographing lens is attached to said camera body, said interfacing means comprising means for receiving data transmitted by said transmitting means, wherein a data loading operation by said second loading means and a calculation operation by said calculating means are performed non-synchronously with a data transmitting operation by said transmitting means in response to said clock pulses issued by said camera body.

2. The camera system of claim 1, wherein said predetermined signal comprises a reset signal issued when a communicative condition between said photographing lens and said camera body is confirmed by said interfacing means.

3. The camera system of claim 1, wherein said first loading means loads said specific initial value lens data in said shift register in a parallel form, said specific initial value lens data being transmitted in a serial form by said transmitting means from said shift register to said receiving means in said camera body.

4. The camera system of claim 3, wherein said first loading means further comprises a memory for storing said specific initial value lens data so that said first loading means loads said specific initial value lens data in said shift register in a parallel form upon issuance of a reset signal.

5. The camera system of claim 3, wherein said data other than said specific initial value lens data is loaded in said shift register in a parallel form by said second loading means after said specific initial value lens data is loaded in said shift register by said first loading means, said data other than said specific initial value lens data being transmitted in a serial form from said shift register to said receiving means in said camera body.

6. The camera system of claim 3, further comprising means for controlling said second loading means in response to said clock pulses issued by said photographing lens so that said data other than said specific initial value lens data calculated by said calculating means is loaded in said shift register when a predetermined vacant area is formed in said shift register in accordance with a transmitting operation by said transmitting means.

7. The camera system of claim 6, wherein said second loading means further comprises data holding means for holding said data other than specific initial value lens data calculated by said calculating means until said predetermined vacant area is formed in said shift register, said holding means being operated in response to said clock pulses issued by said photographing lens.

8. The camera system of claim 7, wherein said data holding means further comprises monitoring means for monitoring operational states of said shift register and said holding means so that said holding means loads said data other than specific initial value lens data in said shift register when said predetermined vacant area is formed in said shift register.

9. The camera system of claim 2, further comprising a lock switch connected to said interfacing means, said communicative condition between said camera body and said photographing lens being initiated by an actuation of said lock switch.

10. The camera system of claim 1, wherein said specific initial value lens data comprises open F-numbers.

11. The camera system of claim 6, wherein said calculating means comprises a lens CPU.

12. A camera system, comprising:
a photographing lens; and
a camera body, said camera body comprising:
a clock pulse generator that produces clock pulses;
a generator that produces a reset signal; and
an interface device that enables an exchange of data between said camera body and said photographing lens when said photographing lens is attached to said camera body;
said photographing lens comprising:
a clock pulse generator that produces clock pulses;
a shift register that stores data;
a transmitter that transmits said data stored in said shift register to said camera body in response to said clock pulses issued by said camera body;
a first loader that loads specific initial value lens data into said shift register in response to said reset signal issued by said camera body;
a processor that determines data other than specific initial value lens data in response to said clock pulses issued by said photographing lens; and
a second loader that loads said data other than specific initial value lens data into said shift register in response to said clock pulses issued by said photographing lens after said specific initial value lens data is loaded into said shift register by said first loader, wherein a data loading operation by said second loader and a determination operation by said processor are non-synchronously performed with a data transmitting operation by said transmitter according to said clock pulses issued by said camera body.

13. The camera system of claim 12, wherein said first loader loads said specific initial value lens data into said shift register in a parallel form, said specific initial value lens data being serially transmitted from said shift register to said camera body via said interface device.

14. The camera system of claim 12, wherein said second loader, in response to said clock pulses issued by said photographing lens, loads said data other than said specific initial value lens data into a predetermined vacant area formed in said shift register.

15. The camera system of claim 14, said second loader further comprising a data holder that holds said data other than specific initial value lens data until said predetermined vacant area is formed in said shift register, said data holder operating in association with said clock pulses issued by said photographing lens.

16. The camera system of claim 12, wherein said specific initial value lens data comprises open F-numbers.

17. The camera system of claim 12, wherein said photographing lens comprises a zoom lens.

18. A camera system, comprising:
a lens, comprising:
a clock signal generator;
a processor; and
a data storage device;
a camera body selectively attached to said lens, comprising:
a clock signal generator; and
a reset signal generator; and
a transferring device that transfers data stored in said storage device of said lens to said camera body in response to said clock pulses issued by said camera body, specific initial value lens data being loaded into said storage device in response to a predetermined signal issued by said camera body, non-specific initial value lens data calculated by said processor being loaded into said storage device in response to said clock pulses issued by said photographing lens after said specific initial value lens data has been loaded into said storage device, said loading of data into said storage device being non-synchronously performed with respect to a data transferring operation by said transferring device.

19. The camera system of claim 18, wherein said specific initial value lens data comprises data specific to said lens.

20. The camera system of claim 18, wherein said non-specific initial value lens data calculated by said processor comprises K-value data corresponding to a focal length and object distance of an object to be photographed.

* * * * *

UNITED STATES PATENT AND TRADEMARK OFFICE
CERTIFICATE OF CORRECTION

PATENT NO. : 5,505,535
DATED : April 9, 1996
INVENTOR(S) : M. KAWASAKI et al.

It is certified that error appears in the above-indentified patent and that said Letters Patent is hereby corrected as shown below:

At column 31, line 30 (claim 6, line 1), change "3," to ---5,---.

Signed and Sealed this

Eighth Day of April, 1997

Attest:

BRUCE LEHMAN

Attesting Officer

Commissioner of Patents and Trademarks